(12) United States Patent
Liu et al.

(10) Patent No.: US 7,903,970 B2
(45) Date of Patent: Mar. 8, 2011

(54) OPTICAL NETWORK EVALUATION SYSTEMS AND METHODS

(75) Inventors: Guanglei Liu, Atlanta, GA (US); Chuanyi Ji, Smyrna, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 857 days.

(21) Appl. No.: 11/694,039

(22) Filed: Mar. 30, 2007

(65) Prior Publication Data

US 2008/0240711 A1    Oct. 2, 2008

(51) Int. Cl.
*H04B 10/08* (2006.01)
(52) U.S. Cl. .............................. 398/57; 398/40
(58) Field of Classification Search ........ 398/25, 398/40, 57
See application file for complete search history.

(56) References Cited

U.S. PATENT DOCUMENTS

| | | | |
|---|---|---|---|
| 5,525,524 A * | 6/1996 | Buechler et al. | 436/518 |
| 6,262,730 B1 * | 7/2001 | Horvitz et al. | 715/707 |
| 6,442,694 B1 * | 8/2002 | Bergman et al. | 726/22 |
| 6,453,174 B1 * | 9/2002 | Cunningham et al. | 455/560 |
| 6,507,012 B1 * | 1/2003 | Medard et al. | 250/225 |
| 6,603,112 B1 * | 8/2003 | Medard et al. | 250/227.11 |
| 6,807,148 B1 * | 10/2004 | Eicher | 370/217 |
| 6,816,681 B2 * | 11/2004 | Li et al. | 398/27 |
| 6,870,901 B1 * | 3/2005 | Shah et al. | 379/22 |
| 6,917,985 B2 * | 7/2005 | Madruga et al. | 709/238 |
| 6,952,779 B1 * | 10/2005 | Cohen et al. | 726/22 |
| 7,174,105 B2 * | 2/2007 | Shahar | 398/98 |
| 2003/0138251 A1 * | 7/2003 | Jayaram et al. | 398/38 |
| 2007/0038698 A1 * | 2/2007 | Peterson | 709/203 |
| 2007/0056029 A1 * | 3/2007 | Kay | 726/11 |
| 2007/0056030 A1 * | 3/2007 | Kay | 726/11 |
| 2007/0067845 A1 * | 3/2007 | Wiemer et al. | 726/25 |
| 2007/0070883 A1 * | 3/2007 | Lysne et al. | 370/218 |
| 2007/0297405 A1 * | 12/2007 | He | 370/389 |
| 2008/0240711 A1 * | 10/2008 | Liu et al. | 398/9 |
| 2008/0304644 A1 * | 12/2008 | Mishra et al. | 379/201.12 |
| 2009/0157371 A1 * | 6/2009 | Conway | 703/13 |

OTHER PUBLICATIONS

Zesheng Chen, "Spatial-Temporal Modeling of Malware Propagation in Networks", Sep. 2005.*
Tao Wu "Necessary and Sufficient Condition for k Crosstalk Attacks Localization in All-Optical Networks", 2003.*
Guanglei Liu and Chuanyi Ji, Probabilistic Graphical Models for Resilience of All-Optical Networks under Crosstalk Attacks, Optical Fiber conference, Mar. 2005, IEEE.
Guanglei Liu and Chuanyi Ji, Resilient Architecture of All-Optical Networks: Probabilistic Graphical Models for Crosstalk Attack Propagation, ISIT, Jul. 9-14, 2006, pp. 2914-2918, 2006 IEEE, Seattle, USA.
Muriel Medard et al., Node wrappers for QoS monitoring in transparent optical nodes, Journal of High Speed Networks, 2001, pp. 247-268, vol. 10, IOS Press.

(Continued)

*Primary Examiner* — Shi K Li
*Assistant Examiner* — Danny W. Leung
(74) *Attorney, Agent, or Firm* — Thomas, Kayden, Horstemeyer & Risley, LLP

(57) ABSTRACT

Embodiments of optical network evaluation systems and methods are disclosed. One system embodiment, among others, comprises a processor configured with logic to provide a cross layer model of disturbance propagation in an optical network based on a combination of a physical layer model and a network layer model, the physical layer mode based on the disturbance propagation having a threshold effect only on nodes along a route followed by the disturbance.

19 Claims, 9 Drawing Sheets

OTHER PUBLICATIONS

Ruth Bergman et al., Distributed Algorithms for Attack Localization in All-Optical Networks, pp. 1-15, Massachusetts Institute of Technology, Lincoln Laboratory, 1998 Network and Distributed System Security.

Tao Wu et al., Cross-Talk Attack Monitoring and Localization in All-Optical Networks, IEEE/ACM Transactions on Networking, Dec. 2005, pp. 1390-1401, vol. 13, No. 6, IEEE.

Guanglei Liu and Chuanyi Ji, Resilience of All-Optical Network Architectures under In-Band Crosstalk Attacks: A Graphical Model Approach, IEEE Journal on Selected Areas in Communications, submitted to IEEE Journal on Selected Areas in Communications, Optical Network series in Oct. 2006 for anticipated Apr. 2007 issue of same, pp. 1-16.

* cited by examiner

OPTICAL NETWORK EVALUATION SYSTEMS AND METHODS

STATEMENT REGARDING FEDERALLY SPONSORED RESEARCH OR DEVELOPMENT

This invention was made with government support under agreement ECS-0300305 awarded by the National Science Foundation. The Government has certain rights in the invention.

CROSS-REFERENCE TO RELATED APPLICATION

This application is related to U.S. provisional patent application entitled "Cross-Layer Graphical Models for Resilience of All Optical Networks Under Cross-Talk Attacks," filed on Jul. 26, 2005, and accorded Ser. No. 60/702,481, which is entirely incorporated herein by reference.

TECHNICAL FIELD

The present disclosure is generally related to optical networks, and, more particularly, is related to systems and methods for evaluation of optical networks.

BACKGROUND

All-optical networks (AONs) are considered a promising technology for next-generation optical networks. Major applications of AONs include metropolitan area networks (MANs) and wide area networks (WANs), but MANs and WANs are not 100% secure. For instance, AONs are susceptible to malicious (or unintentional) disturbances (e.g., attacks or other faults that propagate in a network) since the signals remain in the optical domain within the network, and are hence difficult to monitor closely. Further, due in part to the high data rates supported by AONs, even disturbances of a short duration can result in a large amount of data loss. Hence, security of AONs upon disturbances has become an important issue, where an open question is how to incorporate security against disturbances in the design and engineering of AON architectures. Investigations of this question are important as AONs are still at an early stage of implementation and ground-up developments of secure all-optical networks are possible.

There have been some approaches to this question in the past in the context of crosstalk attacks in AONs. Crosstalk in AONs can be caused by signal leakage among different inputs at non-ideal network devices (e.g. optical switches), as illustrated in FIG. 1. FIG. 1 is a schematic diagram of an optical network node 10 that illustrates crosstalk attacks, and in particular a detrimental type of crosstalk often referred to as in-band crosstalk (e.g., where the crosstalk element is within the same wavelength as the signal). In-band crosstalk attacks can happen at fiber links or network nodes. The optical network node 10 comprises optical fibers 12, 14 coupled to demultiplexers 16 and 18. The demultiplexers 16 and 18 may be used in cooperation with optical filters (not shown). The optical network node 10 further comprises optical switches 20 and 22, which are coupled to demultiplexers 16, 18 by connections 24a, 26a, 28a, and 30a. The optical switches 20 and 22 are also coupled to multiplexers 32 and 34, via connections 24b, 26b, 28b, and 30b, where signals are combined, and then output via connections 36 and 38. The demultiplexers 16 and 18 split the optical signals received on connections 12 and 14 into a plurality of bands of different wavelengths. For instance, signals of a first wavelength (e.g., $\lambda_1$) are provided on connections 24a and 28a, and signals of a second wavelength (e.g., $\lambda_2$) are provided on connections 26a and 30a. As one exemplary mechanism of attack propagation, an attacker may gain legitimate access to a network node at connection 24a and insert a signal flow with strong signal power into the network. Due to the crosstalk effects of wavelength switches, a small fraction of the signal from the attack channel (on connection 24a) may leak into other normal channels (e.g., connection 24b, the leak graphically represented with a dashed line) in a shared switching plane. The leakage superimposed onto normal channels may exceed a predetermined threshold for a quality of service requirement, such that those channels are considered to be affected by the attack at network nodes. In other words, AONs are susceptible to crosstalk attacks.

As AONs grow in span and functionality, they have the potential to provide services to a wider set of applications in the future (e.g. analog services, novel applications that require optical interfaces, etc.). Therefore, there is an increasing demand for access of the AONs from outside parties, such as limited management access to the network from partners and customers of service providers, which results in an increasing threat to optical network security. A wider set of users and an increasingly open platform of optical networks entail a higher risk of misuse of the network, which is evidenced by the security threats such as denial-of-service attacks and worm attacks in the current Internet.

There have been several research activities with an aim to mitigate the threats of crosstalk attacks in AONs, including attack detection based on node wrappers, determination of necessary and sufficient conditions for crosstalk attack localization, and general frameworks for managing faults and alarms in AONs. However, these approaches are reactive in nature. Furthermore, certain crosstalk attacks are difficult to detect. For instance, sporadic crosstalk attacks may disrupt service but "disappear" before it can be detected.

SUMMARY

Embodiments of the present disclosure provide system and methods for evaluating optical networks.

One method embodiment, among others, comprises, for a physical model, modeling propagation of a disturbance in an optical network under static network conditions based on the disturbance propagation having a threshold effect only on nodes along a route followed by the disturbance; for a network model, modeling a status of each network route in the optical network based on the disturbance; and combining the physical layer model and the network layer model to provide a cross layer model that characterizes the disturbance propagation based on network layer and physical layer dependencies and interactions in the optical network.

One system embodiment, among others, comprises a processor configured with logic to provide a cross layer model of disturbance propagation in an optical network based on a combination of a physical layer model and a network layer model.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
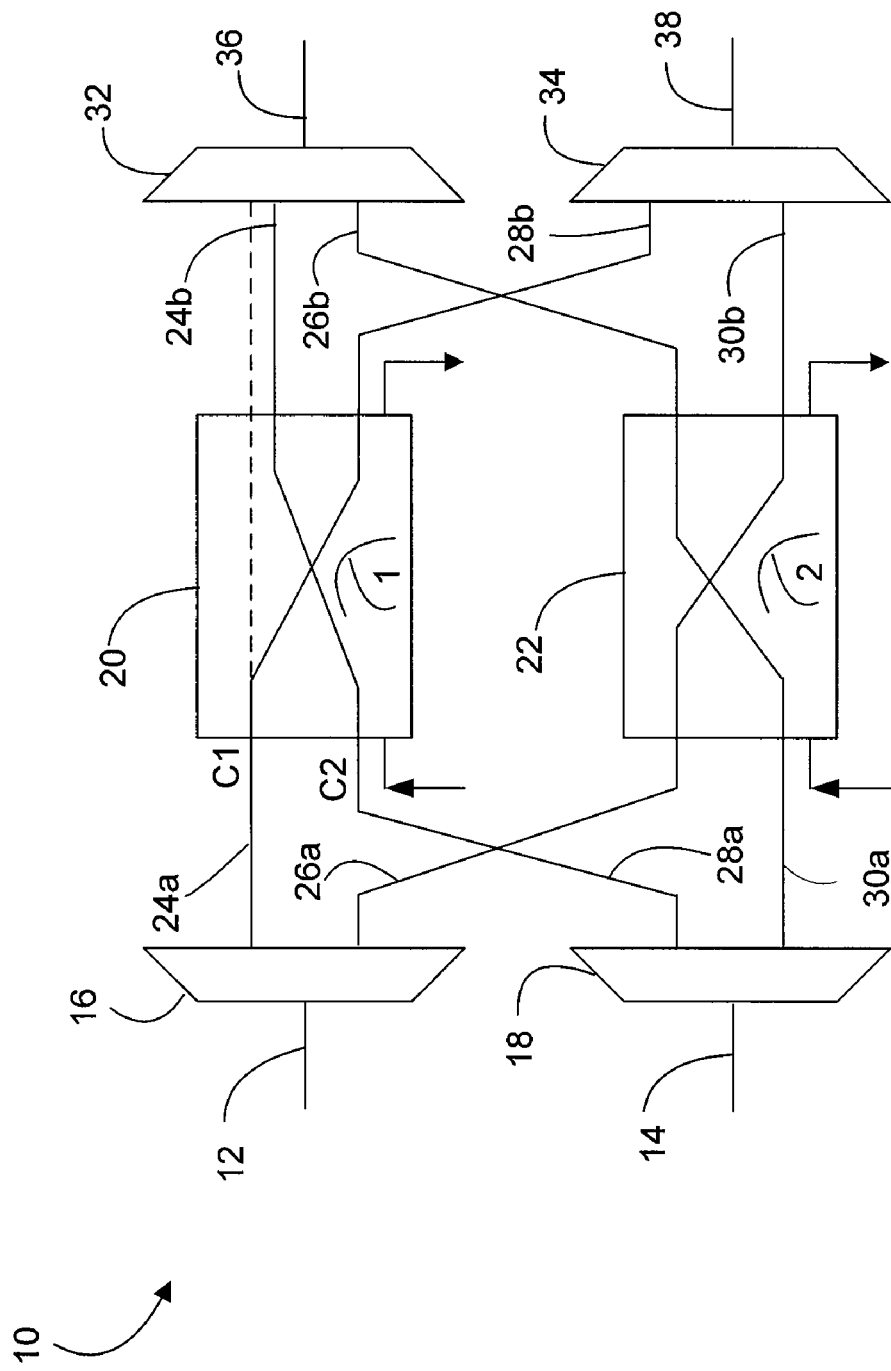
FIG. 1 is a schematic diagram that illustrates exemplary crosstalk attack propagation in an optical network.

Disclosed herein are various embodiments of optical network (ON) evaluation systems and methods. In one embodiment, an ON evaluation system comprises a computer system configured to receive parameters of a particular network and of a disturbance or attack, and responsively generate physical layer and network layer models that are combined to provide insight into disturbance propagation in the context of interactions and dependencies between the physical and network layers of an optical network. Additionally, such an ON evaluation system can be used to determine the resiliency of optical networks to such disturbances, and hence provides a mechanism to address the resiliency of optical networks to deliberate (e.g., attacks) or unintentional disturbances before such disturbances are detected and eliminated from the network.

Certain embodiments of ON evaluation systems and methods are described below in the context of all optical networks (AONs), with the understanding that included within the scope of such networks are hybrid (electrical and optical) networks where evaluation is focused on the optical portions of the hybrid network. Additionally, the various embodiments of the ON evaluation systems are described herein in the context of disturbances embodied as crosstalk, with the understanding that other disturbances, man-made, machine made, and/or inherent in the physical architecture of the particular network, also apply and hence are considered within the scope of the disclosure.

Thus, the disclosure that follows describes the application of probabilistic graphical models to characterize cross-layer attack propagation, including directed probabilistic graphs (e.g., Bayesian Belief Networks) and undirected probabilistic graphs (e.g., Markov Random Fields). In particular, at the physical layer, a directed probabilistic graph is described that models attack propagation under static network traffic and a given source of attack with random attacking power. At the network layer, an undirected probabilistic graph is described that represents the probability distribution of active connections. The ON evaluation systems and methods generate these graphical representations of the physical and network layer models through the execution of the various formulas and methods described herein, and combines the physical- and the network-layer models together to form a cross-layer model that has a factor graph representation.

The cross-layer model is developed using a bottom-up approach and provides an explicit representation of the complex dependencies between the physical- and the network-layer. Furthermore, the graphical models facilitate the analysis of multiple factors from network architecture on network resilience. For regular topologies, bounds may be derived on the network resilience. For irregular and/or large topologies, the cross-layer model provides computationally efficient methods for studying the resilience where the analysis is not feasible.

In the description that follows, an exemplary implementation for certain embodiments of the ON evaluation systems and methods is provided, followed by a system embodiment. The remainder of the disclosure is organized to illustrate an attack propagation model under static traffic and a given source of attack based on a directed probabilistic graph, a network-layer representation using an undirected probabilistic graph, and a cross-layer model based on a factor graph, and using the cross-layer model to quantify network resilience upon crosstalk attacks. Further illustration of an application of the models to the evaluation of network resilience of different network topologies is provided.

Figure 2:
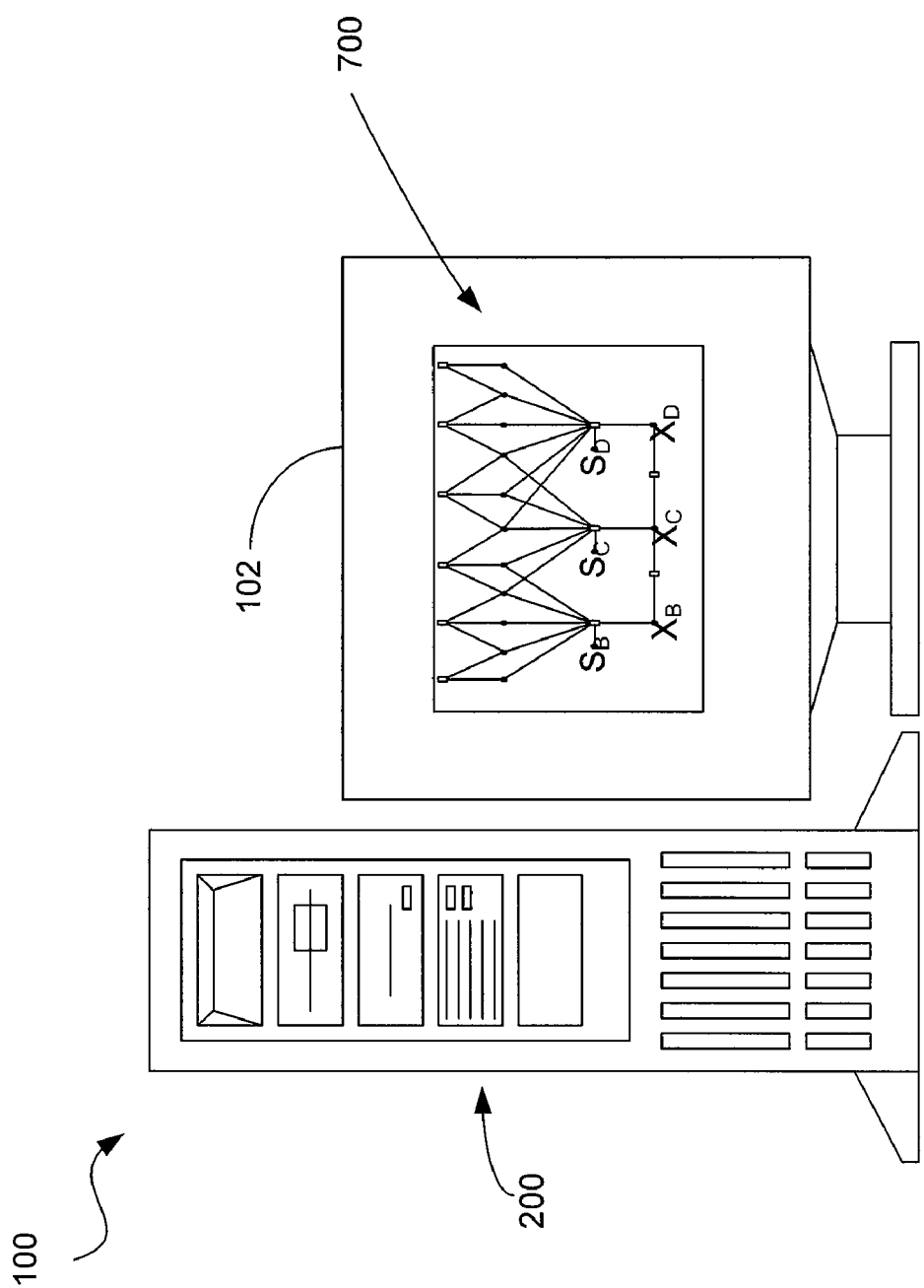
FIG. 2 is a schematic diagram of an example implementation for certain embodiments of optical network evaluation systems and methods.

FIG. 2 is a schematic diagram that depicts a general purpose computer 100 that serves as an example implementation for ON evaluation software, the latter represented with reference numeral 200. In one embodiment, the ON evaluation system comprises the computer 100. The general purpose computer 100 can be in a stand-alone configuration, or networked among other computers. The general purpose computer 100 includes a display terminal 102 that provides a display of, among other things, a representation of the various models generated by the ON evaluation software 200, such as the factor graph 700 shown in the display terminal 102. Other screens may be presented, such as network topologies, user interfaces for enabling user input of optical network parameters, etc. Although the factor graph 700 is shown on the display terminal 102, suggesting graphical representations of the various models generated by the ON evaluation software 200, it should be understood by those having ordinary skill in the art that some embodiments of the ON evaluation system can be implemented in a manner that is transparent, in whole or in part, to the user. For instance, the basis of the various models are in some embodiments equations executed by the ON evaluation software 200, and hence the results of such equation execution may be data that is delivered to other software or devices without the need for a graphical representation.

The ON evaluation system can be implemented in software (e.g., firmware), hardware, or a combination of the same. In the embodiment shown in FIG. 2, the ON evaluation system is embodied as a computer 100 running an executable program (e.g., ON evaluation software 200), and the program is executed by the general purpose computer 100 or other special or general purpose digital computer, such as a personal computer (PC; IBM-compatible, Apple-compatible, or otherwise), workstation, minicomputer, or mainframe computer.

Figure 3:
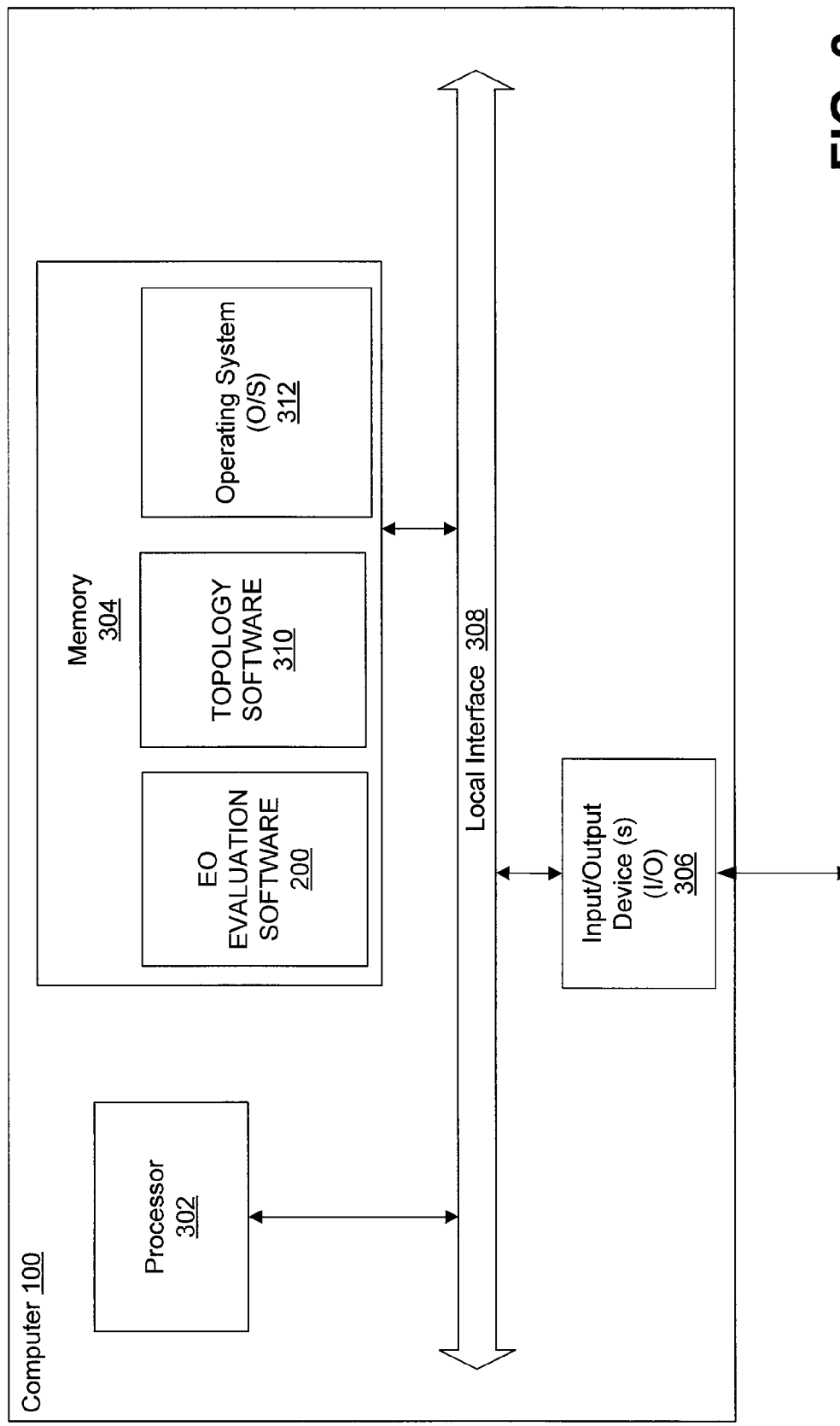
FIG. 3 is a block diagram of an embodiment of the optical network evaluation system shown in FIG. 2.

FIG. 3 is a block diagram showing a configuration of the general purpose computer 100 that can implement the ON evaluation software 200. Generally, in terms of hardware architecture, the computer 100 includes a processor 302, memory 304, and one or more input and/or output (I/O) devices 306 (or peripherals) that are communicatively coupled via a local interface 308. The local interface 308 can be, for example but not limited to, one or more buses or other wired or wireless connections, as is known in the art. The local interface 308 may have additional elements, which are omitted for simplicity, such as controllers, buffers (caches), drivers, repeaters, and receivers, to enable communications. Further, the local interface 308 may include address, control, and/or data connections to enable appropriate communications among the aforementioned components.

The processor 302 is a hardware device for executing software, particularly that which is stored in memory 304. The processor 302 can be any custom made or commercially available processor, a central processing unit (CPU), an auxiliary processor among several processors associated with the computer 100, a semiconductor-based microprocessor (in the form of a microchip or chip set), a macroprocessor, or generally any device for executing software instructions.

The memory 304 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 304 may incorporate electronic, magnetic, optical, and/or other types of storage media. Note that the memory 304 can have a distributed architecture, where various components are situated remote from one another, but can be accessed by the processor 302.

The software in memory 304 may include one or more separate programs, each of which comprises an ordered listing of executable instructions for implementing logical functions. In the example of FIG. 3, the software in the memory 304 includes the ON evaluation software 200, optional network topology software 310, and a suitable operating system (O/S) 312. Such software embodied in a computer readable medium such as memory 304 collectively comprises logic in some embodiments, though not limited to software stored in memory. The network topology software 310 may comprise topology analysis software that can determine the amount of nodes in a network and other operating parameters, and which can provide such network parameters to the ON evaluation software 200 for use in the computation of equations corresponding to physical, network, and cross layer models. The operating system 312 essentially controls the execution of other computer programs, such as the ON evaluation software 200 and the network topology software 310, and provides scheduling, input-output control, file and data management, memory management, and communication control and related services.

The ON evaluation software 200 is a source program, executable program (object code), script, or any other entity comprising a set of instructions to be performed. The ON evaluation software 200 can be implemented, in one embodiment, as a distributed network of modules, where one or more of the modules can be accessed by one or more applications or programs or components thereof. In some embodiments, the ON evaluation software 200 can be implemented as a single module with all of the functionality of the aforementioned modules. When a source program, the program is translated via a compiler, assembler, interpreter, or the like, which may or may not be included within the memory 304, so as to operate properly in connection with the O/S 312.

The I/O devices 306 may include input devices, for example but not limited to, a keyboard, mouse, scanner, microphone, etc. Furthermore, the I/O devices 306 may also include output devices, for example but not limited to, a printer, display, etc. Finally, the I/O devices 306 may further include devices that communicate both inputs and outputs, for instance but not limited to, a modulator/demodulator (modem for accessing another device, system, or network), a radio frequency (RF) or other transceiver, a telephonic interface, a bridge, a router, etc.

When the computer 100 is in operation, the processor 302 is configured to execute software stored within the memory 304, to communicate data to and from the memory 304, and to generally control operations of the computer 100 pursuant to the software. The ON evaluation software 200, the network topology software 310, and the O/S 312, in whole or in part, but typically the latter, are read by the processor 302, perhaps buffered within the processor 302, and then executed.

When the ON evaluation software 200 is implemented in software, as is shown in FIG. 3, it should be noted that the ON evaluation software 200 can be stored on any computer readable medium for use by or in connection with any computer related system or method. The ON evaluation software 200 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In an alternative embodiment, where functionality of the ON evaluation software 200 is implemented in hardware (the hardware providing the ON evaluation system functionality is also referred to herein as logic), such functionality can be implemented, in whole or in part, with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc., or can be implemented with other technologies now known or later developed.

Having described certain embodiments of an ON evaluation system, the following description in association with FIGS. 4-7 explain an underlying process employed by, and/or serving as a basis for, the ON evaluation software 200 to generate a physical layer model, a network layer model, and a cross-layer model based on the combination of the physical and network layer models. In some embodiments, functionality of the ON evaluation software 200 may be distributed among several modules locally or remotely located with respect to each other, wherein one module receives the physical and network layer models from another module(s) co-located or remotely located (e.g., resident on one or more external devices), and wherein the one module responsively generates the cross-layer model (and respective graphical representation found in the factor graph 700). In particular, the description and accompanying drawings that follow generally focus on three, though not limited to three, components of network architectures against crosstalk attacks: (a) physical layer optical devices, (b) physical topology, and (c) wavelength usage at the network layer, which is determined by network layer traffic.

One goal of the various methods described herein is to quantify the effects of these factors against crosstalk attacks, and hence characterize the interactions of at least these three factors of network architectures during crosstalk attack propagation. For instance, attacks propagate to active wavelength channels of the same wavelength as the attacker's flow. Reference herein to a channel refers to frequency band of one wavelength, although it should be understood in the context of this disclosure that multiple wavelength crosstalk attack (or other disturbance) propagation is considered to be within the scope of this disclosure. Meanwhile, wavelength usage at the network layer is dependent because of the sharing of network links among different connections. Therefore, the various models (whether represented graphically or in equation form) provide an explicit representation of the cross-layer interactions.

Before proceeding with an explanation of FIGS. 4-7, a formulation of the problem of solving attack propagation is presented below. The topology of an AON is defined as an undirected graph G(V,E), with V being a set of nodes and E being a set of bi-directional links. Denote $V_i \sim V_j$ if there is one bi-directional link between $V_i$ and $V_j$, $V_i$, $V_j \in V$. Let R be a finite set of routes in the network. Assume that there are no wavelength converters in the AON. A connection on router, $r \in R$, is defined as a bi-directional light-path on route r that consists of one unidirectional flow in each direction. Each bi-directional link described below consists of two optical fibers, one for each direction. Hence, reference to a "connection" hereinafter includes a reference to bi-directional traffic, and reference to "flows" refers to uni-directional traffic. Further, an assumption is made that each wavelength can only be used by one active connection on the same network link. Additionally, single-source in-band crosstalk attacks are considered in the examples that follow. That is, a crosstalk attack is started at the source node of a unidirectional flow on wavelength $\lambda$, and propagates to flows that use the same wavelength. As the disclosure that follows focuses on in-band crosstalk attacks, "flows", "connections", and "channels" are typically used hereinafter without explicit reference to their associations with wavelength $\lambda$.

Let $S_i$ be a random variable that denotes the number of active channels affected by the in-band crosstalk attack at the switching plane of node $V_i$. Vector $S=(S_i:V_i \in V)$ corresponds to the number of affected channels at each node in the network. Let $N_{ij}$ denote the status of route $r_{ij}$, where $N_{ij}=1$ if there is an active connection on route $r_{ij}$ between node $V_i$ and $V_j$, for $r_{ij} \in R$; $N_{ij}=0$, otherwise. Vector $N=(N_{ij}:r_{ij} \in R)$ then represents the status of all network routes in R. Let $f_{sd}$ be denoted as the flow starting from node s and terminating at node d. Given this problem formulation, it is understood in the context of this disclosure that one goal is to obtain the following quantities to characterize attack propagation.

(a) $P(S|N=n, R_f=f_{sd})$: The probability of the number of channels affected at each network node given the status of network routes n and the source of attack $R_f$, where $R_f$ denotes the unidirectional flow where the attack originates. This probability represents attack propagation under a given n and $f_{sd}$, and is to be characterized through a directed probabilistic graph.

(b) $P(N|R_f=f_{sd})$: The probability of the status of network routes given the source of attack, which is to be described using an undirected probabilistic graph.

(c) $P(S|R_f=f_{sd})$: The probability of the number of channels affected at each node given the source of attack, which models attack propagation under dynamic traffic. This probability combines the physical- and the network-layer models from (a) and (b), and is described with a factor graph representation.

The cross-layer model is then used to study network resilience based on the resilience loss for a given attack flow and the average resilience loss over all possible attack flows.

Given that there is a crosstalk attack started on flow $f_{sd}$, the network resilience loss can be defined as follows:

$$M_{f_{sd}} = \sum_{V_i \in V} E_{f_{sd}}[S_i], \quad (1)$$

$$\text{where } E_{f_{sd}}[S_i] = \sum_{S_i} s_i P(S_i = s_i | R_f = f_{sd})$$

is the expected number of affected channels at node $V_i$ given the source of the attack. $M_{f_{sd}}$ denotes the total number of active channels affected when the attack starts from a particular flow.

Additionally, the average network resilience loss of the network can be defined as $M=E_{R_f}[M_{f_{sd}}]$, where $E_{R_f}[\ ]$ stands for the expectation over the source of the attack $R_f$, i.e., $$M = \sum_{f_{sd}} M_{f_{sd}} P(R_f = f_{sd}), \quad (2)$$

where $$P(R_f = f_{sd}) = \frac{1}{2|R|} P(N_{sd} = 1), \quad (3)$$

with the assumption that each network route in R is equally likely to be an attacker's route, and the attack is started on one of the two unidirectional flows on the attacker's route with an equal probability.

Given the above-described formulation of the problem, reference is now made to FIG. 1 to illustrate the nature of an exemplary source of a cross-talk attack and how such an attack can propagate through an optical network. The physical layer model is determined to model attack propagation under static network traffic and a given source of attack. For example, one exemplary mechanism involves in-band crosstalk attacks where an attacker gains legitimate access to the network and injects signals of high power into a flow. Due to imperfect switching arrays, the attacker's channel (e.g., on connection 24a) may affect other channels (e.g., on connection 24b) that share the switching plane (e.g., the plane that supports the actual switching fabric for the input signals, such as switch 20 in FIG. 1), causing malfunctions at several locations in the network. As explained above, FIG. 1 depicts an example of in-band crosstalk attack. At each network node, channels of the same wavelength (e.g., on connections 24a, 28a) from different input fibers 12 and 14 share the same switching plane. Suppose that the crosstalk is initiated on flow C1 (on connections 24a) using wavelength $\lambda_1$ from input fiber 12. All the wavelength channels that share a switching plane with C1 (e.g., channel C2 on connection 28a from input fiber 14) may be contaminated by C1's power leakage.

In particular, a network node, such as network node 10 of FIG. 1, is affected by the attack if the amount of in-band crosstalk incurred by normal channels (e.g., channels in the network that are not the attacker's channel) at the switching plane of that node exceeds a predetermined threshold. Each node along the attacker's route may be affected by the attack due to the high signal power of the attack flow, but the chance for nodes that are not on the attacker's route to be affected by the attack is negligible. That is, normal flows affected by the attack flow at one or more network nodes along the attacker's route do not have attacking capability, as its signal power is unlikely to be increased by more than half the normal channel power. For instance, consider the example in FIG. 1. Suppose, at one time instant, the attacker's jamming power is 20 dB higher than the normal channel power and the optical switches have a crosstalk ratio of −35 dB. Then the power of flow C2 is increased by around −15 dB of the normal channel power at node 10. The power of flow C2 at a second node (not shown) coupled to optical fiber 38, for instance, is in the same order as in node 10, whose crosstalk leakage to flow leaving the second node is negligible given the crosstalk ratio of −35 dB.

Currently, optical switches with crosstalk ratios much less than −35 dB are commercially available. Thus, in the models of the present disclosure, the in-band crosstalk caused by normal flows is ignored, and it is assumed that only nodes along the attacker's route may be affected by the attack. Note that work prior to this disclosure on cross-talk attacks assumes that attacks may propagate to nodes that are not on the attacker's routes. Such a distinction from prior work renders the approach described in this disclosure less complex and more informative than prior approaches, as explained further below in association with FIG. 5. In addition, attacks propagate to all the active channels that share the switching plane with the attacker's channel at each affected node. Based on these assumptions, the probabilistic attack propagation model can be described in the following sections.

A physical layer model is derived based on the following considerations. Consider a crosstalk attack started at node s on flow $f_{sd}$. Let the set of nodes traversed by flow $f_{sd}$ be $V_{f_{sd}} = \{V_1, V_2, \ldots, V_k\}$, where $V_1$ and $V_k$ are the source and the destination nodes respectively. The attack propagation is characterized by the status of each node in $V_{f_{sd}}$ and the status of wavelength channels at the switches of those nodes.

The status of node $V_i$ can be defined as a binary variable $X_i$. Specifically, let the signal power of a normal flow at the switching plane of each node be $u_n$ when there is no attack in the network. Let the crosstalk ratio of the switches in the network be $l_c$ and let $c_{th}$ be a predetermined constant. Then $X_i = 1$ if the amount of in-band crosstalk incurred by a normal channel at the switching plane of node $V_i$ exceeds $c_{th} u_n$; $X_i = 0$, otherwise. Furthermore, node $V_i$ is affected by the attack if $X_i = 1$.

The use of binary nodal states facilitates the investigation of crosstalk attack propagation with random attacking power at the source. To be specific, the amount of in-band crosstalk at each node under attack may have a wide range of values. But the binary status of crosstalk levels at a node is simple and often observable. In fact, a frequent scenario for attack detection and monitoring is whether a predetermined threshold or service guarantee is violated at each node. When the amount of crosstalk is below the threshold, the node is "up", i.e., operational; otherwise, the node is "down", i.e., affected.

Hence the attacker's jamming power is treated as a random variable that obeys a certain probability distribution. The status of network nodes under crosstalk attacks then becomes (i.e., is represented as) binary random variables. The randomness lies in the fact that the crosstalk level is random due to the random jamming power of the attack. If the attacker's jamming power has a higher probability of being large, it is more likely for the attack to propagate farther away from the source node.

To determine the status of each node under attack, consider the attenuation of the jamming power of flow $f_{sd}$ along its route. The signal power of flow $f_{sd}$ in the switching plane of node $V_i$ is denoted as a random variable $U_i$, $i = 1, 2, \ldots k$. The attenuation of the jamming power of $f_{sd}$ along its route can be captured using deterministic composite functions that depend on the characteristics of optical devices. Additionally, it is assumed that there exists an input erbium-doped fiber amplifier (EDFA) and an output EDFA at each side of a node (e.g., node 10 of FIG. 1), respectively. Note that in some embodiments, the techniques described herein can be extended to the derivation of physical layer models using other amplifiers (e.g., Raman amplifiers, etc.). Furthermore, the following parameters can be defined:

$l_{i,1}$: Signal loss ratio of node $V_i$ before the flow enters the switching plane, which mainly includes signal loss at a demultiplexer (e.g., demultiplexers 16 and 18, as shown in FIG. 1).

$l_{i,2}$: Signal loss ratio of node $V_i$ after the flow enters the switching plane, which mainly includes loss at the switching plane and a multiplexer (e.g., multiplexers 32 and 34).

$a_{i,j}$: Signal loss ratio of the fiber span between node $V_i$ and node $V_j$.

$g_{i,1}(\ )$: The gain of the EDFA at the input side of node $V_i$.

$g_{i,2}(\ )$: The gain of the EDFA at the output side of node $V_i$.

For a given network, $l_{i,1}$, $l_{i,2}$, $a_{i,j}$ are constants; $g_{i,1}(\ )$ and $g_{i,2}(\ )$ are deterministic non-linear functions of the input power to the amplifiers (e.g., EDFAs).

Additionally, the following gain model for EDFAs can be adopted:

$$g_{ij}(P_{input}) = \begin{cases} d_{ij}, & \text{if } P_{input} \leq p_{th}, \\ 1 + \dfrac{p_{sat}}{P_{input}} \log \dfrac{g_0}{g_{ij}(P_{input})}, & \text{otherwise}, \end{cases} \quad (4)$$

where $P_{input}$ is the total input power; $p_{sat}$ is the internal saturation power; $g_0$ is the small signal saturated gain; $p_{th}$ is the input power threshold for successful gain clamping, and $d_{ij}$ is the clamped gain value.

Assume that the attacker's flow ($f_{sd}$) does not share EDFAs with other flows. This corresponds to a conservative model of the jamming power attenuation and a worst-case scenario of in-band attack propagation, as all the photons of the EDFAs are used to amplify the attacker's signal. Then, $$U_{i+1} = l_{i+1,1} \pi_{i+1,1}(a_{i,i+1} \pi_{i,2}(l_{i,2} U_i)), \quad (5)$$

where $\pi_{i,j} = P_{input} g_{i,j}(P_{input})$ is the output power of the EDFA with gain $g_{ij}(P_{input})$ and input power $P_{input}$. Then, composite function $\tau_{j-1,j}(\tau_{j-2,j-1}(\ldots \tau_{i,j+1}(.)))$ captures the attenuation of the jamming power between node $V_i$ and $V_j$.

Further, assume that, when there is no crosstalk attack in the network, amplifiers on each fiber operate in the gain clamped regions and make up the signal attenuation between two nodes. Furthermore, assume that the attacker's jamming power at the source node of the attack follows a cumulative distribution function $\eta(U)$ with minimum power $u_{min}$, $u_{min} \geq c_{th} u_n / l_c$, and maximum power $u_{max}$. Then, it can be shown that the status of each node along the attacker's route, $X_i$, $i = 1, 2, \ldots, k$, form a Markov Chain. Specifically, $$P(X_1 = 1) = 1. \quad (6)$$

$$P(X_{i+1} | X_1, X_2, \ldots, X_i) = P(X_{i+1} | X_i), i = 1, 2, \ldots, k-1. \quad (7)$$

$$P(X_{i+1} = 1 | X_i = 0) = 0. \quad (8)$$

$$P(X_{i+1} = 1 | X_i = 1) = \frac{P(U_{i+1} > c_{th}/I_c)}{P(U_i > c_{th}/I_c)} = \frac{1 - \eta(\delta_{1,i+1})}{1 - \eta(\delta_{1,i})}, \quad (9)$$

where $\delta_{1,i}$, $1 \leq i \leq k-1$, corresponds to the minimum value of jamming power at node $V_1$ such that attack can propagate to node $V_i$, and satisfies, $$\tau_{i-1,i}(\tau_{i-2,i-1}(\ldots\tau_{1,2}(\delta_{1,i})))=c_{th}u_n/l_c. \quad (10)$$

The derivation of (7) to (9) can be explained as follows: Let $U_i$ denote the jamming power of the attack flow at node $V_i$, $\forall V_i \in V_{f_{sd}}$. It can be shown that if $U_i \geq U_{i+1}$ for $1 \leq i < k$, then $P(X_{i+1}|X_1, X_2, \ldots, X_i) = P(X_{i+1}|X_i)$. Suppose $U_i \geq U_{i+1}$. Since $X_i = 1$, if $U_i > c_{th}/(l_c u_n)$; and $X_i = 0$, otherwise. It follows that $P(X_1 = x_1, X_2 = x_2, \ldots, X_i = x_i) \neq 0$, only if $x_1 \geq x_2 \geq \ldots \geq x_i$. Let $k_1 = \max\{j: x_j = 1 \ \& \ 1 \leq j \leq i\}$, which is the largest index of nodes affected by the attack among $V_1, V_2, \ldots, V_i$. Then, (a) If $1 \leq k_1 < i$, $X_1 = 1, \ldots X_{k_1} = 1, X_{k_1 1} = 0, \ldots, X_i = 0$. Therefore $$P\left(\begin{array}{l} X_{i+1} = 0 \mid X_1 = 1, \ldots X_{k_1} = 1, \\ X_{k_1+1} = 0, \ldots, X_i = 0 \end{array}\right) = \frac{P\left(\begin{array}{l} X_1 = 1, \ldots, X_{k_1} = 1, \\ X_{k_1+1} = 0, \ldots, X_i = 0, \\ X_{i+1} = 0 \end{array}\right)}{P\left(\begin{array}{l} X_1 = 1, \ldots, X_{k_1} = 1, \\ X_{k_1+1} = 0, \ldots, X_i = 0 \end{array}\right)} \quad (11)$$

$$= \frac{P(X_{k_1} = 1, X_{k_1+1} = 0)}{P(X_{k_1} = 1, X_{k_1+1} = 0)} = 1.$$

Since $P(X_{i-1}=0|X_i=0)=1$, the following is observed:

$$P(X_{i-1}|X_1, X_2, \ldots, X_i) = P(X_{i+1}|X_i).$$

(b) If $1 \leq k_1 = i$, $X_1 = 1, \ldots, X_i = 1$. Therefore, $$P(X_{i+1} = 0 | X_1 = 1, \ldots, X_i = 1) = \frac{P(X_1 = 1, \ldots, X_i = 1, X_{i+1} = 0)}{P(X_1 = 1, \ldots, X_i = 1)} \quad (12)$$

$$= \frac{P\left(\begin{array}{l} U_1 > c_{th}/(I_c u_n), \ldots, U_i > \\ c_{th}/(I_c u_n), U_{i+1} < c_{th}/(I_c u_n) \end{array}\right)}{P(U_1 > c_{th}/(I_c u_n), \ldots, U_i > c_{th}/(I_c u_n))}$$

$$= \frac{P(U_i > c_{th}/(I_c u_n), U_{i+1} < c_{th}/(I_c u_n))}{P(U_i > c_{th}/(I_c u_n))}$$

$$= \frac{P(X_i = 1, X_{i+1} = 0)}{P(X_i = 1)}$$

$$= P(X_{i+1} = 0 | X_i = 1).$$

Next, it can be shown that $U_i \geq U_{i-1}$, assuming that, when there is no crosstalk attack in the network, amplifiers on each fiber operate in the gain clamped regions and make up the signal attenuation between the two nodes. From (5) above, the following is observed.

$$U_{i+1} = \tau_{i,i+1}(U_i) = l_{i+1,1}\pi_{i+1,1}(a_{i,i+1}\pi_{i,2}(l_{i,2}U_i)),$$

and $$l_{i+1,1}a_{i,i+1}l_{i,2}d_{i,2}d_{i+1,1} = 1, \quad (13)$$

where $d_{i,2}$ denotes the clamped gain of EDFA at the output side of node $V_i$; $d_{i+1,1}$ denotes the clamped gain of EDFA at the input side of node $V_{i+1}$. Then, If $l_{i,2}U_i \leq p_{th,(i,2)}$, $U_{i+1} = U_i$, (14)

If $l_{i,2}U_i > p_{th,(i,2)}$, $\pi_{i,2}(l_{i,2}U_i) < d_{i,2}U_i$, (15)

which corresponds to the case where the EDFA with subscript (i,2) works at the saturation region. Therefore, $$U_{i+1} < l_{i+1,1}d_{i+1,1}a_{i,i+1}d_{i,2}l_{i,2}U_i.$$

It follows that $U_i \geq U_{i+1}$. To prove (9) above, it suffices to show that $\tau_{i,i+1}(U_i)$ monotonically increases in $U_i$, where $$U_{i+1} = \tau_{i,i+1}(U_i) = l_{i+1,1}\pi_{i+1,1}(a_{i,i+1}\pi_{i,2}(l_{i,2}U_i)).$$

Since $l_{i+1,1}$, $a_{i,i+1}$, and $l_{i,2}$ are constants, to show that $\tau_{i,i+1}(U_i)$ monotonically increases in $U_i$, it suffices to show that $\pi_{ij}(P_{input})$ monotonically increase in $P_{input}$. This can be obtained by showing $$\frac{\partial(P_{input}g(P_{input}))}{\partial P_{input}} > 0 \text{ for } (4).$$

This means that the higher the input power at EDFA, the higher the output power when the EDFA works at either the saturated or the non-saturated region.

The conditional probabilities in (9) can take different forms depending on $\eta(U)$. For simplicity, the following can be denoted:

$$P(X_{i+1} = 1 | X_i = 1) = \alpha_i, \quad (16)$$

$$\text{where } \alpha_i = \frac{1 - \eta(\delta_{1,i+1})}{1 - \eta(\delta_{1,i})},$$

where $\delta_{1,i}$, $1 \leq i < k$, as in (10) above.

If it is further assumed that the attacker's jamming power at the source node of the attack is uniformly distributed in $[u_{min}, u_{max}]$, (9) can be rewritten as follows:

$$P(X_{i+1} = 1 | X_i = 1) = \frac{\max\{0, u_{max} - \max\{u_{min}, \delta_{1,i+1}\}\}}{u_{max} - \max\{u_{min}, \delta_{1,i}\}}. \quad (17)$$

Hereinafter in this disclosure, it is assumed that $\alpha_i$'s are known.

The number of active channels affected by the attack at the switching plane of node $V_i$ is considered. Let $R_{ij}$ be the set of network routes that use link ij. Under static traffic, $$\sum_{r_{uv} \in R_{ij}} n_{uv}$$

corresponds to the number of flows that enter the switching plane of node $V_i$ through link ij;

$$\sum_{r_{ih} \in R_{ij}} n_{ih}$$

corresponds to the number of flows that are locally originated from node $V_i$ and enter the network through link ij. Hence, under static network traffic, the total number of affected channels at the switching plane of $V_i$, $V_i \in V_{f_{sd}}$, is given by the following equation:

$$P(S_i = s_i \mid X_i = x_i, N = n, R_f = f_{sd}) = \tag{18}$$

$$\begin{cases} 1, & \text{if } s_i = \sum_{V_i \sim V_j} \left\{ \sum_{r_{uv} \in R_{ij}} n_{uv} + \sum_{r_{ih} \in R_{ij}} n_{ih} \right\} \text{ and } x_i = 1, \\ 1 & \text{if } s_i = 1 \text{ and } x_i = 0, \\ 0, & \text{otherwise.} \end{cases}$$

Equation (18) provides that, when node $V_i$ is affected by the attack, all the active channels at the switching plane of $V_i$ are affected by the attack; otherwise, if node $V_i$ is not affected by the crosstalk attack, only one channel (e.g., only the channel used by flow $f_{sd}$ itself) is affected by the attack at the node. That is, equation (18) describes a probability distribution of the number of channels affected by the attack given the following parameters: (a) the status of node $X_i$; (b) the status of each network route in the network, n; and (c) the source of the attack flow $f_{sd}$. In equation (18), $$\sum_{r_{uv} \in R_{ij}} n_{uv}$$

corresponds to the number of flows that enter the switching plane of node $V_i$ through link ij;

$$\sum_{r_{ih} \in R_{ij}} n_{ih}$$

corresponds to the number of flows that are locally originated from node $V_i$ and enter the network through link ij. Therefore, $$\sum_{V_i \sim V_j} \left\{ \sum_{r_{uv} \in R_{ij}} n_{uv} + \sum_{r_{ih} \in R_{ij}} n_{ih} \right\}$$

corresponds to the total number of active wavelength channels in the switching plane of node $V_i$. Hence, equation (18) describes that when node $V_i$ is affected by the attack, all the active channels at the switching plane of $V_i$ are affected by the attack; otherwise, if node $V_i$ is not affected by the crosstalk attack, only one (e.g., only the channel used flow $f_{sd}$ itself), is affected by the attack at the node.

Combining equations (16) and (18) results in a physical-layer attack propagation model, expressed by the following equation:

$$P(X_{f_{sd}}, s_{f_{sd}} \mid N = n, R_f = f_{sd}) = \tag{19}$$

$$\prod_{i=1}^{k-1} P(X_{i+1} \mid X_i, R_f = f_{sd}) \prod_{i=1}^{k} P(S_i \mid X_i, N = n, R_f = f_{sd}),$$

where $S_{f_{sd}} = (S_i : V_i \in V_{f_{sd}})$, $X_{f_{sd}} = (X_i : V_i \in V_{f_{sd}})$, which is the status of nodes in the attacker's route, and k is the number of node in $V_{f_{sd}}$. Therefore, under static network traffic (given N=n), $(X_i, S_i : V_i \in V_{f_{sd}})$ forms a directed probabilistic graph (Bayesian Belief Network). Each node in the probabilistic graph represents either $X_i$ or $S_i$. There is one directed edge from $X_i$ to $X_{i+1}$ and one directed edge from $X_i$ to $S_i$ respectively. Note that, given N=n and $X_i = x_i$, $S_i$ is deterministic, but $S_i$ is included for an explicit graphical representation of attack propagation. Note that equation (18) provides a detailed form of a conditional probability in equation (19), and equations (6) through (9), (16) and (17) correspond to a derivation of a second conditional probability in equation (19).

Figure 4:
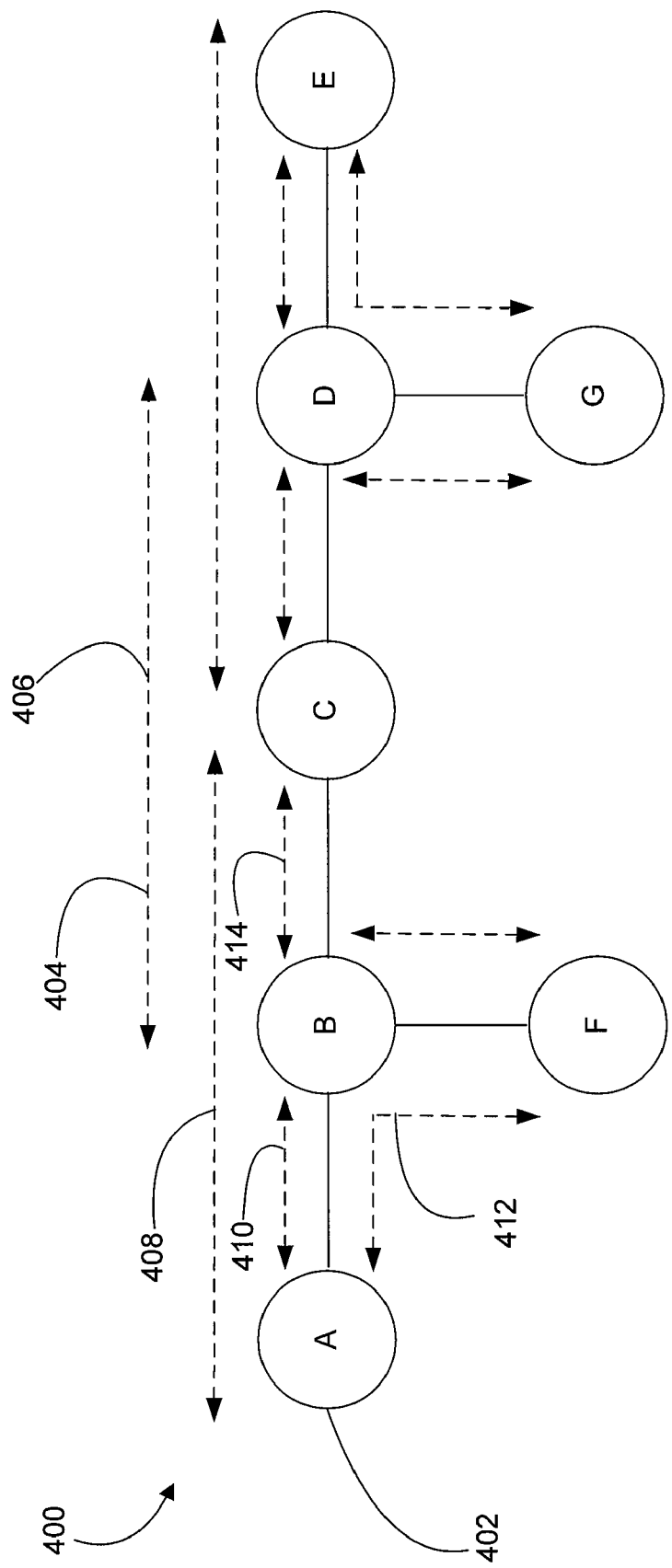
FIG. 4 is schematic diagram that illustrates an exemplary mesh network with a plurality of routes.

Having described the derivation of a physical layer model, reference is now made to FIG. 4. FIG. 4 is a schematic diagram that illustrates an exemplary mesh network 400 with a plurality of routes (e.g., eleven routes). That is, the exemplary mesh network 400 comprises a plurality of nodes 402 (seven nodes 402 are shown labeled A, B, C, D, E, F, and G) and a plurality of routes 404 (eleven routes, where all the routes in R are marked in dashed lines). Suppose that the crosstalk attack is started on flow BD 406. Reference herein to an attacker's route (or disturbance route) refers to the route traversed between an attacker's flow. For instance, with reference to FIG. 4, if the attacker's flow is $f_{bd}$, then the attacker's route is the route from node B to node D, which passes through links BC and CD. In certain embodiments, a node is considered as affected by an attack if the amount of in-band crosstalk incurred by normal channels from that particular node exceeds a predetermined threshold. Branches off the route BD (e.g., the branch from node B to node F) are not part of the attacker's route. As explained above, in prior work, nodes that are not part of the attacker's route are assumed to be affected by the attack, in contrast to the various embodiments described herein, as further described below in conjunction with FIG. 5. The directed probabilistic graph representation 500 of attack propagation is shown in FIG. 5.

Figure 5:
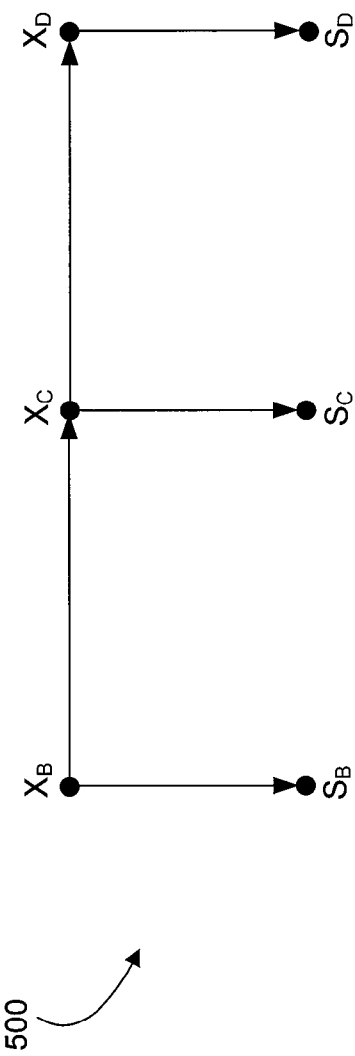
FIG. 5 is a schematic diagram that illustrates a directed probabilistic graph representation of attack propagation for the mesh network shown in FIG. 4.

Referring to the directed graph representation 500 of FIG. 5 and the mesh network 400 of FIG. 4, a disturbance may propagate from node B to node C, then further from node C to node D, as evidenced by the directional edge from node B to node C and from C to D. Whether a node is affected by the attack or not is denoted by the variables Xi, where i in this example equals B, C, and D. Meanwhile, the number of affected channels at each node can be found from variable(s) S. Under static network traffic, the number of affected channels at each node is determined by the status of that node, which is indicated by directed edges from variable Xi to variable Si, where i equals B, C, and D.

Several differences are noted between the directed graph 500 of FIG. 5 and previous work on cross-talk attack models. For instance, in the March 2005 publication authored by the inventors of the current disclosure and entitled, "Probabilistic Graphical Models for Resilience of All-Optical Networks under Crosstalk Attacks," it is assumed that attack propagation includes nodes not located on the attacker's route, as explained above. Such assumptions at the time of that publication were based in part on the relative infancy in the field of security in optical networks and less advanced optical technologies related to optical switches and crosstalk ratios. Under such prior assumptions and referring to FIG. 5, additional directed edges would be shown from $X_B$ to neighboring nodes that can be affected by the attack, for instance an $X_A$ located in FIG. 5 to the left of $X_B$ or an $X_F$ located below $X_A$, or similarly to a neighboring node below or beyond $X_D$. In contrast, and referring to FIG. 5, the physical layer model involves the status of nodes only on the attacker's route.

Referring to FIG. 5, and drawing further distinctions between the disclosure and the March 2005 publication, $X_B$ represents whether node B is affected by the attack or not. $S_B$ represents the number of affected channels in the switching plane of node B. To contrast with prior work in this field, assume the $S_B$ is replaced with an $X_F$. According to the March 2005 publication authored by the inventors and referenced above, a directed edge from $X_B$ to $X_F$ represents the conditional probability of node F (which is not along an attacker's route) being affected by the attack given the status of node B. That is, in the March 2005 publication, consideration is given of an attack that propagates from node B to node F. In contrast, the directed edge from node $X_B$ to node $S_B$ represents the conditional probability of the number of affected channels in the switching plane of node B given the status of node B. The current physical layer model considers the damage caused by the attack at a particular node given its status.

Additionally, the March 2005 publication fails to teach or suggest how to determine the probability of attack (e.g., probability that an attack propagates from node B to C and from C to D, etc.). That is, one skilled in the art is not able to derive the parameters of the models based on the March 2005 disclosure. Further, and as explained above, previous approaches lack the directed edge pertaining to the variable S, and hence fail to provide a graphical representation of attack propagation (e.g., the status of each node along an attacker's route).

Note that in context of modeling AON signal transmissions, the physical-layer model described above is developed with the following assumptions: (1) the in-band crosstalk due to channels with normal signal power and/or nonlinear effects is ignored; (2) under normal operations, the EDFAs work at a gain-clamped region and make up for the signal losses between two network nodes; (3) the optical switches have the same crosstalk ratio and threshold of crosstalk leakage for the definition of node affection. Note that reference to node affection or the like refers to a node being "affected" by the attack. For instance, a node is affected by an attack if the amount of in-band crosstalk incurred by normal channels at the switching plane of that node exceeds a predetermined threshold for quality of service requirement. Assumption (1) is reasonable because of the low crosstalk ratio of current optical switches. If assumption (2) is relaxed (e.g., does not hold) so that the EDFAs work at gain-clamped region under normal operations, but may make up for more than the signal losses between two network nodes, then the status of nodes along the attacker's route may still form a Markov Chain. However, the order of nodes in the Markov Chain does not necessarily follow the sequence of $X_1, X_2, \ldots, X_k$. The same is true, if assumption (3) is relaxed so that optical switches in the network have different crosstalk ratios or the thresholds of crosstalk leakage for the definition of node affection are heterogeneous for different nodes.

Another approach to model the attack propagation is to define a random variable that corresponds to the position of the last affected node along the attacker's route. This model is equivalent to the Markov Chain model in (6) to (16), but does not include explicitly the status of each node. Thus, such a model does not visually signify the actual attack propagation along the attacker's route.

The physical layer model described by Equation (19) characterizes attack propagation under static network traffic. Under dynamic traffic, however, the status of each network route $N_{sd}$, $r_{sd} \in R$, is random and can be characterized using a network layer model. To obtain the network layer model, $P(N|R_f=f_{sd})$ is to be obtained, which is the probability distribution of route status given the source of the attack. From (3) above, the following equation is provided:

$$P(N|R_f=f_{sd})=P(N|N_{sd}=1). \tag{20}$$

Then it suffices to find P(N), which can be characterized by an undirected probabilistic graph.

An undirected probabilistic graph can be represented as G=(V, E), where V represents a set of vertices, and E represents a set of edges. Each node $V_i \in V$ represents a random variable. A subset of nodes $V_C$ is said to separate two other subsets of nodes $V_A$ and $V_B$ if every path joining every pair of nodes $V_i \in V_A$ and $V_j \in V_B$ has at least one node from $V_C$. An undirected probabilistic graph implies a set of conditional independence relations. That is, for any disjoint subsets of nodes in the undirected graph, $V_A$, $V_B$, and $V_C$, if $V_C$ separates $V_A$ and $V_B$, then $V_A$ and $V_B$ are conditional independent given $V_C$. A node is separated from other nodes in the undirected graph by all its neighbors.

A clique denotes a subset of V that contains either a single node or several nodes that are all neighbors of one another. Then the joint probability distribution of V has a product form, as shown below:

$$P(V) = Z^{-1} \prod_{q \in C} \psi_q(\{V_i : V_i \in V_q\}), \tag{21}$$

where Z is the normalizing constant, $$Z = \sum_V \prod_{q \in C} \psi_q(\{V_i : V_i \in V_q\}); \psi_q$$

is a non-negative function defined for clique $V_q \in C$, and C denotes the set of all the cliques in the graph G.

The network-layer model is formed as follows. Each vertex in the undirected probabilistic graph represents the status of a route $N_{ij}$, $r_{ij} \in R$. Furthermore, the status of all network routes that share the same link forms a clique. It has been shown that the steady state distribution of the number of calls in loss networks without control form a Markov Random Field (MRF), which is one type of undirected probabilistic graph. The MRF representation can be generalized to an undirected probabilistic graph representation that includes explicitly the dependence among different routes due to the capacity constraint and the network load.

Figure 6:
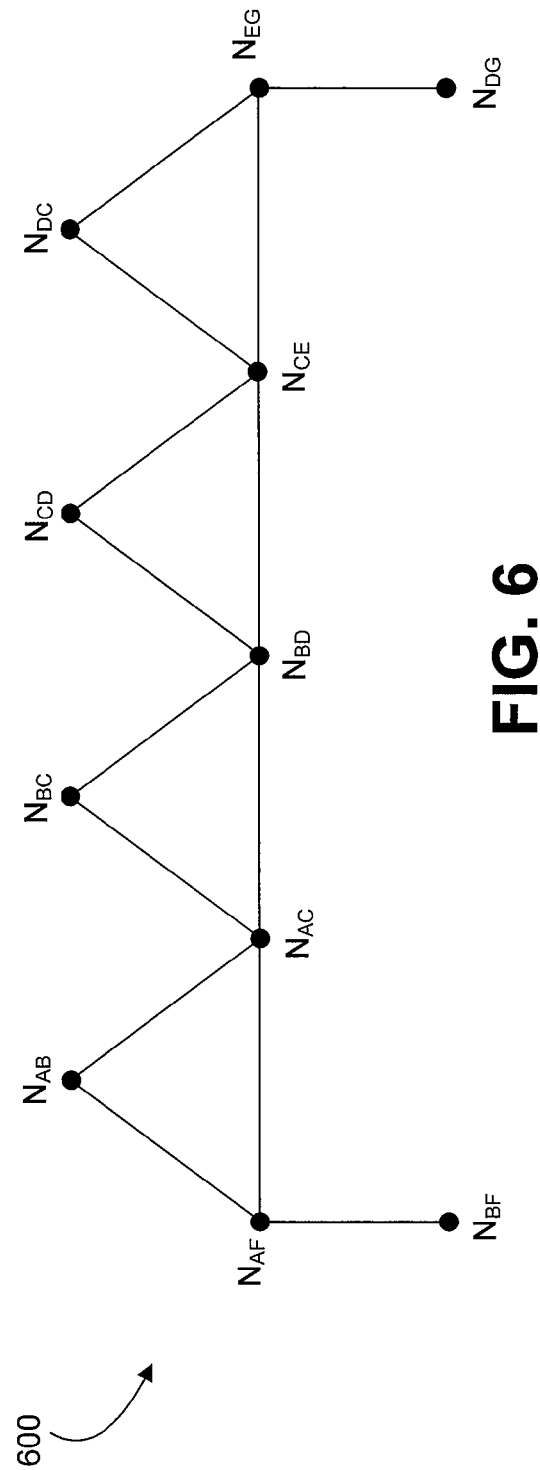
FIG. 6 is a schematic diagram that illustrates an undirected probabilistic graph representation of network routes for the mesh network shown in FIG. 4.

For the exemplary mesh network 400 shown in FIG. 4, the corresponding network-layer model 600 is shown in FIG. 6. Referring to FIGS. 4 and 6, consider route AC 408, which traverses two network links: AB and BC. Meanwhile, link AB is in route AB 410 and route AF 412; link BC is in route BC 414 and route BD 406. Since wavelength λ can only be used by one connection on each network link, route AC 408 has a contention of wavelength usage with routes AB 410, AF 412, BC 414, and BD 406. However, once the status of routes AB 410, AF 412, BC 414 and BD 406 is known, the status of route AC 408 can be determined without violating the capacity constraints. Hence, routes AB 410, AF 412, BC 414 and BD 406 are neighbors of route AC 408 and separate route AC from routes in the rest of the network, as shown in FIG. 6.

Therefore, by defining routes that share the same network link as neighbors, the capacity constraint in the undirected probabilistic graph is captured. The probability distribution of all network routes can be obtained by specifying proper clique potentials based on (21). The clique potentials are selected to characterize both the dependencies among different network routes and the varying network load.

In the discussion of physical layer models above, $R_{ij}$ is denoted as a subset of routes in R that traverse link ij. A clique, denoted as $C_{ij}$, can then be formed with all the routes in $R_{ij}$. Then the potential function of $C_{ij}$, denoted as $\psi_{ij}$, is obtained as follows: (1) $\psi_{ij} \neq 0$ if and only if the capacity constraint is satisfied (e.g., at most one route in $R_{ij}$ is active); (2) if the wavelength is used on link ij, then $\psi_{ij} = \gamma_{ij}$; otherwise, $\psi_{ij} = 1 - \gamma_{ij}$, $0 < \gamma_{ij} < 1$. From (21), the joint probability of all routes satisfies the following equation:

$$P(N) = \frac{1}{Z_N} \prod_{(V_i \sim V_j)} \gamma_{ij}^{\Sigma_{r_{uv} \in R_{ij}} N_{uv}} (1-\gamma_{ij})^{(1-\Sigma_{r_{uv} \in R_{ij}} N_{uv})} I_1\left(\sum_{r_{uv} \in R_{ij}} N_{uv}\right), \quad (22)$$

where $I_1\left(\sum_{r_{uv} \in R_{ij}} N_{uv}\right) = 1$ if $\sum_{r_{uv} \in R_{ij}} N_{uv} = 0$ or 1; and $$I_1\left(\sum_{r_{uv} \in R_{ij}} N_{uv}\right) = 0, \text{ otherwise.}$$

The clique functions are non-zero if and only if $I_1(\Sigma_{r_{uv} \in R_{ij}} N_{uv}) = 1$. Thus (22) characterizes the dependencies of routes that result from the capacity constraints. For instance, the potential function for the clique that corresponds to the routes using link AB, i.e., route $N_{AB}$, $N_{AF}$, and $N_{AC}$, is $$\psi_{AB} = \gamma_{AB}^{(N_{AB}+N_{AF}+N_{AC})}(1-\gamma_{AB})^{1-(N_{AB}+N_{AF}+N_{AC})} I_1(N_{AB} + N_{AF} + N_{AC}). \quad (23)$$

Note that $(N_{AB}+N_{AF}+N_{AC})$ corresponds to the total number of active connections using wavelength λ at link AB. As each wavelength can be used by at most one active connection, $(N_{AB}+N_{AF}+N_{AC}) = 0$ or 1. Thus, $$I_1(N_{AB} + N_{AF} + N_{AC}) = \begin{cases} 1 & \text{if } N_{AB} + N_{AF} + N_{AC} = 0 \text{ or } 1, \\ 0 & \text{otherwise.} \end{cases}$$

where $\gamma_{AB}$ can be considered as the weight of using wavelength λ at link AB. The potential function is $\gamma_{AB}$ if wavelength λ is used at link AB; and $1-\gamma_{AB}$ if wavelength λ is not used at link AB.

The above network layer model equation (22) represents an advancement over the network layer model described in previous work by the inventors, namely the March 2005 publication, "Probabilistic Graphical Models for Resilience of All-Optical Networks under Crosstalk Attacks." For instance, the network layer model described herein only involves the status of each route (represented by parameter, N), which is a simple and straightforward formulation for the network layer model. In contrast, the network layer model in the March 2005 publication additionally involves the status of each link (represented by the parameter, W), as follows:

$$P(N, W) = \frac{1}{Z_N} \prod_{(V_i \sim V_j)} \gamma_{ij}^{W_{ij}} (1-\gamma_{ij})^{(1-W_{ij})} I_2\left(\sum_{r_{uv} \in R_{ij}} N_{uv}, W_{ij}\right),$$

where $I_2\left(\sum_{r_{uv} \in R_{ij}} N_{uv}, W_{ij}\right) = 1$ if $\sum_{r_{uv} \in R_{ij}} N_{uv} = W_{ij}$ and $W_{ij} \in \{0, 1\}$; and $$I_1\left(\sum_{r_{uv} \in R_{ij}} N_{uv}\right) = 0, \text{ otherwise.}$$

The network load (e.g., the probability that wavelength λ is used in the network) is characterized by parameter, $\gamma_{ij}$. $\gamma_{ij}$ can be considered as a "weight" for using a wavelength at link ij; $1-\gamma_{ij}$ can be considered as a "weight" for not using a wavelength at link ij. When $\gamma_{ij} \equiv \gamma$, $\forall V_i \sim V_j$, $\gamma$ can be related to the network load as follows:

Proposition 1: Let ρ denote the network load, $$\rho = E_{P(N)}\left[\frac{\sum_{V_i \sim V_j} \sum_{r_{uv} \in R_{ij}} N_{uv}}{|E|}\right].$$

If in (22), $\gamma_{ij} \equiv \gamma$, $\forall V_i \sim V_j$, then ρ monotonically increases in γ. A detailed proof of Proposition 1 can be explained as follows:

To prove Proposition 1, it suffices to show that $$\frac{\partial \rho}{\partial \gamma}, \forall \, 0 < \gamma < 1.$$

From (22), assume $\gamma_{ij} \equiv \gamma$, then, $$P(N) = \quad (24)$$

$$\frac{1}{Z_N} \prod_{(V_i \sim V_j)} \gamma^{\Sigma_{r_{sd} \in R_{ij}} N_{sd}} (1-\gamma)^{(1-\Sigma_{r_{sd} \in R_{ij}} N_{sd})} I_1\left(\sum_{r_{sd} \in R_{ij}} N_{sd}\right).$$

Let $$W_{ij} = \sum_{r_{uv} \in R_{ij}} N_{uv} \text{ and } W = (W_{ij} : V_i \sim V_j).$$

W is a vector that represents the wavelength usage at each link in the network. A configuration of (N, W) with non-zero probability is denoted as a traffic pattern, i.e., a traffic pattern (N, W) satisfies the capacity constraints and $P(N=n, W=w) > 0$. Let $T_k$, $k = 0, 1, \ldots, |E|$, be the set of traffic patterns that k links in the network are used by active connections, with |E| being the number of links in E. Let $|T_k|$ denote the cardinality of $T_k$, then, $$\rho = E_{P(N)}\left[\frac{\sum_{V_i \sim V_j} \sum_{r_{sd} \in R_{ij}} N_{sd}}{|E|}\right] = \frac{\sum_{k=0}^{|E|} k\gamma^k(1-\gamma)^{|E|-k}|T_k|}{|E|\sum_{k=0}^{|E|}\gamma^k(1-\gamma)^{|E|-k}|T_k|} \quad (25)$$

$$= \frac{\sum_{k=1}^{|E|} k\theta^k|T_k|}{|E|\sum_{k=0}^{|E|}\theta^k|T_k|} \stackrel{definition}{=} \xi(\theta),$$

where $\theta = \gamma/(1-\gamma)$, $\theta > 0$.

$$\frac{\partial(\xi(\theta))}{\partial\theta} = \frac{1}{|E|\left(\sum_{k=0}^{|E|}\theta^k|T_k|\right)^2} \quad (26)$$

$$\left\{\left(\sum_{k=1}^{|E|}k^2\theta^{k-1}|T_k|\right)\left(\sum_{k=0}^{|E|}\theta^k|T_k|\right) - \left(\sum_{k=1}^{|E|}k\theta^k|T_k|\right)\left(\sum_{k=1}^{|E|}k\theta^{k-1}|T_k|\right)\right\}.$$

Using Cauchy-Schwartz Inequality, it can be shown that $$\partial(\xi(\theta))/\partial\theta > 0, \forall \theta > 0. \quad (27)$$

Since $\partial\theta/\partial\gamma > 0$, $\forall 0 < \gamma < 1$, the following is obtained:

$$\partial\rho/\partial\gamma > 0, \forall 0 < \gamma < 1. \quad (28)$$

Therefore, $\rho$ increases monotonically in $\gamma$.

Referring to Proposition 1, (a) if $\gamma = 0.5$, the undirected probabilistic graph represents a uniform probability distribution on all possible ways of using wavelength $\lambda$ without violating the capacity constraint; (b) If $\gamma \to 1$, $\rho$ increases toward the maximum value, which is determined by both the network topology and the route set R; and (c) If $\gamma \to 0$, $\rho$ approaches 0. For simplicity of analysis, it is assumed that $\gamma_{ij} = \gamma$, $\forall V_i \sim V_j$, in the rest of the disclosure. From (22), it follows that $$P(N|R_f = f_{sd}) \propto n_{sd} P(N|N_{sd}, N_{sd} = 1). \quad (29)$$

Having described the derivation of the physical and network layer models above, the cross-layer model of attack propagation can be obtained by combining the physical- and the network-layer model using a factor graph, which corresponds to the following joint probability:

$$P(X_{f_{sd}}, S_{f_{sd}}, N|R_f = f_{sd}) = P(S_{f_{sd}}, X_{f_{sd}}|N, R_f = f_{sd})P(N|R_f = f_{sd}), \quad (30)$$

where $X_{f_{sd}} = (X_i : V_i \in V_{f_{sd}})$ and $S_{f_{sd}} = (S_i : V_i \in V_{f_{sd}})$. That is, equation (30), describes a cross-layer model according to one embodiment. In equation (30), $P(S_{f_{sd}}, X_{f_{sd}}|N, R_f = f_{sd})$ corresponds to the physical layer model, which characterizes the probability distribution of the status and the number of affected channels at each node on the attacker's route given the status of each route and the source of attack. Additionally, $P(N|R_f = f_{sd})$ in equation (30) corresponds to the network layer model, which characterizes the probability distribution of the status of each network route given the source of attack.

A factor graph generally refers to a bipartite graph showing how a global function can be factorized into a product of local functions. Each local function depends on a subset of the variables. There are two types of nodes in a factor graph: a variable node for each variable, and a factor node for each local function. There is an edge connecting a variable node to a factor node if and only if the variable is an argument of the local function.

Figure 7:
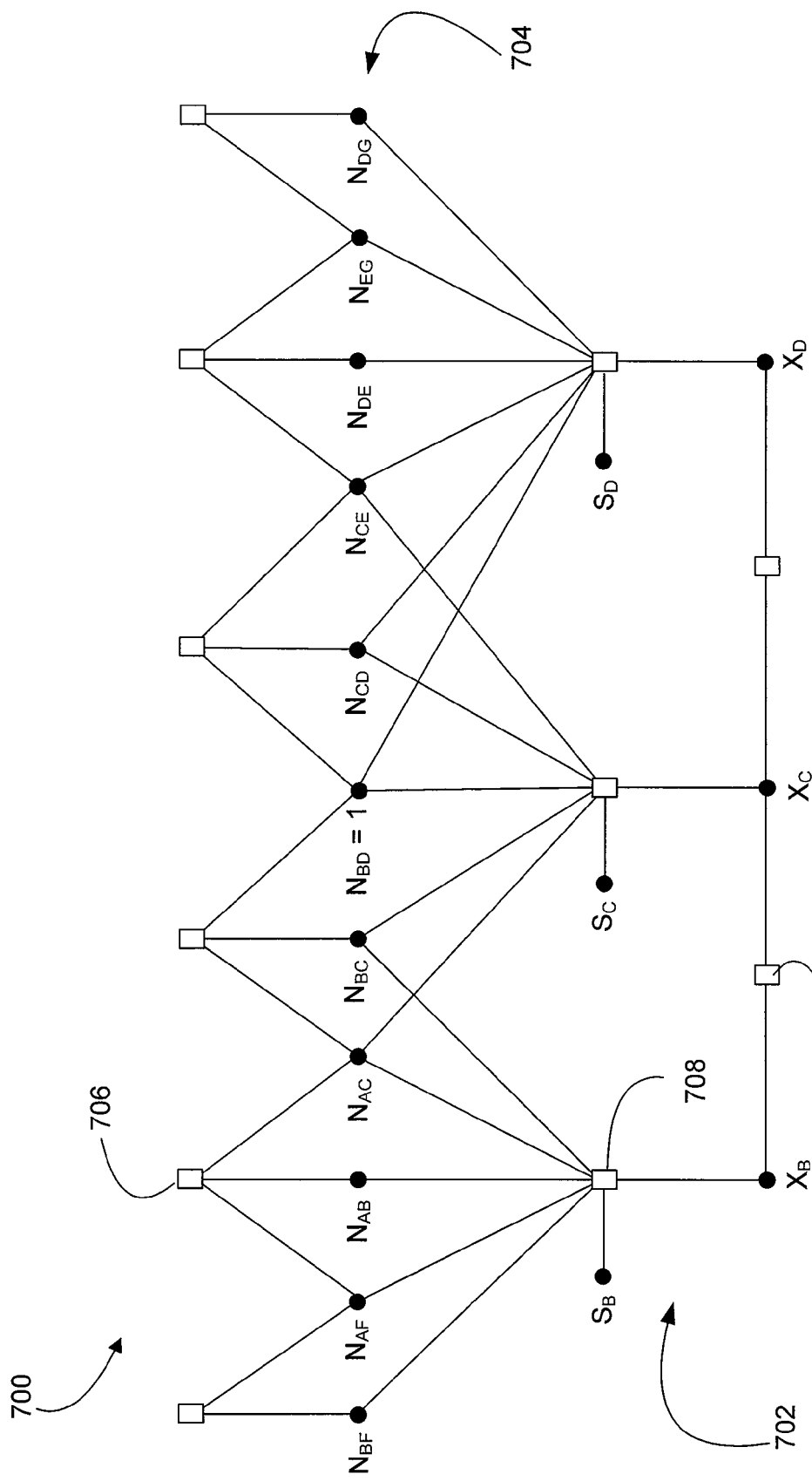
FIG. 7 is a schematic diagram that illustrates a factor graph representation of the mesh network shown in FIG. 4.

FIG. 7 shows the factor graph representation 700 for the mesh network in FIG. 4 when the attack is started from flow BD. The lower portion 702 of the factor graph 700 represents attack propagation at the physical layer. As the attack may propagate from node $V_i$ to $V_{i+1}$, $V_i$, $V_{i+1} \in V_{f_{sd}}$, $X_i$ and $X_{i+1}$ are connected to the same factor node $P(X_{i+1}|X_i, R_f = f_{BD})$ 710. Furthermore, the number of affected channels at node $V_i$ is determined by $X_i$ and routes that traverses node $V_i$. Therefore, $S_i$, $X_i$, and those routes passing through node $V_i$ are connected to the factor node 708 that describes the conditional probability in (18).

The upper portion 704 of the factor graph 700 characterizes the dependence at the network layer. All the network routes that share a common network link ij are connected to the clique function $\psi_{ij}$ in (22). Here, the factor graph 700 provides an explicit representation of the dependencies among different network components during attack propagation. Additional features of interest in the factor graph 700 include the clique function for link AB 706.

Explaining FIG. 7 further, the graph 700 provides a cross-layer view of disturbance propagation in the network. The lower portion 702 of the graph 700 corresponds to the disturbance propagation at the physical layer corresponding to FIG. 5. As explained above, if the disturbance started on flow BD, it may propagate from node B to node C, and from node C to node D. Whether the node is affected by the attack or not is denoted by the variables Xi (i=B, C, and D). Further, how likely the attack may propagate to the next node depends on the functional nodes between two adjacent nodes (e.g., component 710 in FIG. 7 determines how likely the disturbance may propagate from node B to node C).

The upper portion 704 of the graph 700 corresponds to the network layer model corresponding to FIG. 6, which shows how different routes in the network are dependent. All the network routes that share a same network link are connected to the same functional node. For instance, route AF, AB, AC all traverse link AB, thus the variables that denote the status of these three routes are connected to the same function node 706.

Given the status of each network node and the status of each route that passes the particular node, the number of affected channels can be decided. For example, node B is passed through by route BF, AF, AB, AC, and BC. Therefore, the variables denoting the status of these routes are connected to the same functional node 708 with variables $X_B$ and $S_B$. Thus, the cross-layer model provides an efficient visualization for disturbance propagation in the network, characterizing the disturbance propagation based on the network layer and the physical layer dependencies and interactions in the optical network.

Factor graphs subsume directed and undirected probabilistic graphical models, and provide explicit representations of the factorization of probability distributions. The application of factor graphs provides at least two advantages: (1) it shows the intricate dependencies among different network components during a crosstalk attack; and (2) it provides computationally efficient algorithms to evaluate the network resilience loss, as described further below.

The cross-layer model can be used to study network resilience. The following description provides an explanation of resilience in the context of the physical layer and quantifies how the resilience varies with physical topology as well as the physical layer vulnerabilities, the latter characterized by $\alpha_i$ in (16). Consider the impact of physical-layer vulnerabilities by considering the lower and upper bounds of network resilience loss $M_{f_{sd}}$. The lower bound of $M_{f_{sd}}$ results from the best-case scenario of resilience upon attack: there are no active connections on wavelength $\lambda$ that traverse link ij, $\forall V_i \in V_{f_{sd}}, V_j \notin V_{f_{sd}}$, $V_i \sim V_j$. In this case, at the switching plane of each node along the attacker's route, only two channels are active that correspond to the connection on the attacker's route. The upper bound results from the worst-case scenario of network resilience upon attack: there always exists an active connection inserted into the network at node $V_i$ and traverses link ij, $\forall V_i \in V_{f_{sd}}$, $V_j \notin V_{f_{sd}}$, $V_i \sim V_j$. In this case, the number of active channels in the switching plane of node $V_i$ is $2(d_i-1)$ or $2d_i$, $\forall V_i \in V_{f_{sd}}$, where $d_i$ is the nodal degree of $V_i$.

For simplicity, assume $\alpha_i \equiv \alpha$, $\forall V_i \in V_{f_{sd}}$. Then, the network resilience loss for a given source of attack $f_{sd}$ can be bounded according to Proposition 2 as follows:

$$k + \sum_{i=1}^{k} \alpha^{i-1} \leq M_{f_{sd}} \leq k + 2(1 + \alpha^{k-1}) + \sum_{i=1}^{k}(2d_i - 3)\alpha^{i-1}, \quad (31)$$

where k is the total number of nodes in $V_{f_{sd}}$, k>1. The lower bound in (31) characterizes the effect of route-length and $\alpha$ on attack propagation, which increases polynomially with respect to $\alpha$. Furthermore, $$k + \sum_{i=1}^{k} \alpha^{i-1} = \begin{cases} k + 1 + \alpha + o(\alpha), & \text{as } \alpha \to 0, \\ 2k - 0.5k(k-1)(1-\alpha) + o(1-\alpha), & \text{as } \alpha \to 1, \end{cases} \quad (32)$$

which shows that $M_{f_{sd}}$ is determined by the length of route $r_{sd}$. The upper bound in (31) increases approximately linearly with $\alpha$, where $$k + 2(1 + \alpha^{k-1}) + \sum_{i=1}^{k}(2d_i - 3)\alpha^{i-1} = \begin{cases} k + 2d_1 - 1 + (2d_2 - 3)\alpha + o(\alpha), & \text{as } \alpha \to 0 \text{ and } k > 2, \\ k + 2d_1 - 1 + (2d_2 - 1)\alpha + o(\alpha), & \text{as } \alpha \to 0 \text{ and } k = 2, \\ (4-2k) + 2\sum_{i=1}^{k} d_i + \left\{\frac{3}{2}k^2 - \frac{7}{2}k + 2 - \sum_{i=1}^{k} 2d_i(i-1)\right\}, \\ \quad (1-\alpha) + o(1-\alpha) \end{cases} \quad \text{as } \alpha \to 1, \quad (33)$$

which shows that, when there is an active connection inserted into the network at node $V_i$ using link ij, $\forall V_i \in V_{f_{sd}}$, $V_j \notin V_{f_{sd}}$, $V_i \sim V_j$, if the network vulnerability is low, $M_{f_{sd}}$ is determined by the route length and the nodal degree of the source node of the attack. If the network vulnerability is high, $M_{f_{sd}}$ is determined by the total number of network links incidental on nodes along the attacker's flow, e.g., the number of links in set $E_{f_{sd}} = \{e_{ij}: V_i \in V_{f_{sd}}\}$. In addition, $$|E_{f_{sd}}| = \sum_{i=1}^{k} d_i + (1 - k).$$

The lower- and upper-bounds in (31) can be used to study the impact of physical topology on $M_{f_{sd}}$. For clarity, the asymptotic results on $M_{f_{sd}}$ in (32) and (33) for network resilience under various topologies are summarized below in Table I. Assume that there is one link-shortest route between each pair of nodes in the network. The asymptotic properties of these topologies are summarized in Table II. Combining the impacts of physical-layer vulnerability and physical topology, the following observations can be made:

(1) If the physical-layer vulnerability is high ($\alpha \to 1$), (i) The upper bound of $M_{f_{sd}}$ shows that fully-connected mesh networks and star networks are the least resilient due to the large size of the set $E_{f_{sd}}$.

(ii) The lower bound of $M_{f_{sd}}$ shows that networks with a ring topology are generally the least resilient because of the large route length in a ring network.

(2) If the physical-layer vulnerability is low ($\alpha \to 0$), (i) The upper bound of $M_{f_{sd}}$ shows that the fully-connected mesh topology is the least resilient since each node in the network has nodal degree m−1.

(ii) The lower bound of $M_{f_{sd}}$ shows that the ring network is generally the least resilient due to the large route length.

(3) Chord networks exhibit good resilience whose resilience loss $M_{f_{sd}}$ increases logarithmically with respect to the number of nodes in the network in the worst case.

Note that in addition to the resilience measure considered in this work, there exists other performance metrics for network resilience, e.g. two-terminal connectivity, and flexibility in route selection. Therefore, different performance metrics of network resilience are to be considered simultaneously when choosing a resilient network design. Overall, a chord network offers excellent resilience upon crosstalk attacks and good route selection flexibility.

TABLE I

Bounds of Network Resilience Loss $M_{f_{sd}}$

| bounds $\alpha$ | Upper bound of $M_{f_{sd}}$ | Lower bound of $M_{f_{sd}}$ |
|---|---|---|
| $\alpha \to 1$ | $2\sum_{i=1}^{k} d_i + (4 - 2k) - O(1 - \alpha)$ | $2k - O(1 - \alpha)$ |
| $\alpha \to 0$ | $k + 2d_1 - 1 + O(\alpha)$ | $k + 1 + O(\alpha)$ |

TABLE II

Asymptotic Properties of Different Network Topologies with m Nodes

| Topology | Ave. nodal degree | Ave. route length | Ave. size of $E_{f_{sd}}$ |
|---|---|---|---|
| Star | 1 | 2 | m |
| Ring | 2 | m/4 | m/4 |

TABLE II-continued

Asymptotic Properties of Different Network Topologies with m Nodes

| Topology | Ave. nodal degree | Ave. route length | Ave. size of $E_{f_{sd}}$ |
|---|---|---|---|
| n-ary Tree | m + 1 | $O(\log_n m)$ | $O(\log_n m)$ |
| Mesh-Torus | 4 | $O(\sqrt{m})$ | $O(\sqrt{m})$ |
| Fully-Connected Mesh | m | 1 | m |
| Chord [23] | $\log_2 m$ | $O(\log_2 m)$ | $O(\log_2 m)$ |

Having described the resilience in the context of the physical model, attention is directed now to the impact of the network layer on the resilience in terms of network load, and in particular, quantifying how the network resilience varies jointly with the load, and the physical-layer vulnerability α. Network resilience is determined in one embodiment by the following equations (34) and (35). Consider the impact of network load ρ on $M_{f_{sd}}$. From (1), $$M_{f_{sd}} = \sum_{V_i \in V_{f_{sd}}} E_{f_{sd}}[S_i], \quad (34)$$

where $E_{f_{sd}}[S_i]$ is the mean number of channels affected by the attack at the switching plane of node $V_i$, $V_i \in V_{f_{sd}}$. Furthermore, $$E_{f_{sd}}[S_i] = \quad (35)$$

$$1 + \alpha^{j-1} \left\{ 1 + \sum_{V_i \sim V_j, V_j \notin V_{f_{sd}}} \left\{ E_{f_{sd}}\left[\sum_{r_{uv} \in R_{ij}} N_{uv}\right] + E_{f_{sd}}\left[\sum_{r_{ih} \in R_{ij}} N_{ih}\right] \right\} \right\},$$

$$\forall V_i \in V_{f_{sd}}, \text{ where } E_{f_{sd}}\left[\sum_{r_{ih} \in R_{ij}} N_{ih}\right]$$

s the mean number of active channels that are locally inserted into the network at node $V_i$ and leave node $V_i$ through link ij, and $$E_{f_{sd}}\left[\sum_{r_{uv} \in R_{ij}} N_{uv}\right]$$

is the mean number of active flows that enter node $V_i$ through link ji, given that the attack starts from flow $f_{sd}$. The network resilience loss $M_{f_{sd}}$ does not always increase with ρ for arbitrary networks with arbitrary routes. However, when practical route sets are considered, $M_{f_{sd}}$ increases with ρ for several typical network topologies.

Explaining equations (34) and (35) further, equation (34) characterizes the expected number of affected channels in the network given that the attack started from flow $f_{sd}$. $E_{f_{sd}}[S_i]$ is the expected number of channels affected by the attack at node i given that the attack is started on flow $f_{sd}$.

$$E_{f_{sd}}\left[\sum_{r_{ih} \in R_{ij}} N_{ih}\right]$$

is the mean number of active channels that are locally inserted into the network at node $V_i$ and that leave node $V_i$ through link ij, and $$E_{f_{sd}}\left[\sum_{r_{uv} \in R_{ij}} N_{uv}\right]$$

is the mean number of active flows that enter node $V_i$ through link ji, given that the attack starts from flow $f_{sd}$. Parameter α corresponds to the physical layer vulnerability to the disturbance, and denotes the conditional probability that the attack may propagate to the next downstream node on the attacker's route given that the current node is affected by the attack.

Referring now to the different network topologies, consider Point 1: For a ring network, assume the route set R consists of the two-link disjoint routes between each pair of nodes in the network. Let k be the number of nodes traversed by the attacker's flow $f_{sd}$. Then, $M_{f_{sd}}$ monotonically increases in ρ. In particular, $M_{f_{sd}}$ satisfies the following:

$$v_1 + 2(1 + \alpha^{k-1})\gamma \le M_{f_{sd}} \le v_1 + 2(1 + \alpha^{k-1})\rho, \quad (36)$$

where $v_1 = k + 2\sum_{i=1}^{k} \alpha^{i-1}$.

Furthermore, for $0<\rho<<1$, $\rho=\gamma+o(\rho)$, and the upper and the lower bounds meet $$M_{f_{sd}} = v_1 + 2(1+\alpha^{k-1})\rho + o(\rho). \quad (37)$$

Detailed proof of Point 1 with regard to ring networks can be explained as follows. Consider a ring network G(V,E) with m nodes (m>1). The route set R consists of the two link-disjoint routes between each pair of nodes in the network. Suppose the crosstalk attack is started on flow $f_{ij}$ between node $V_i$ and $V_j$, i,j=1, 2, ..., m, i<j. The set of nodes traversed by flow $f_{ij}$ is $V_{f_{ij}} = \{V_i, V_{i+1}, ..., V_j\}$. Then at most two nodes, node $V_{i-1}$ and node $V_{j+1}$, are neighbors of nodes in $V_{f_{ij}}$, but are not in $V_{f_{ij}}$ themselves. Without loss of generality, one focus is on the conditional wavelength usage at the link between $V_j$ and $V_{j+1}$.

To show that $M_{f_{ij}}$ monotonically increases in ρ for the ring network, from (35), it suffices to show that $$E_{f_{ij}}\left[\sum_{r_{uv} \in R_{j,j+1}} N_{uv}\right] \text{ and } E_{f_{ij}}\left[\sum_{r_{jh} \in R_{j,j+1}} N_{jh}\right]$$

monotonically increase with parameter γ in (24) for the ring network. Let $$W_{ij} = \sum_{r_{uv} \in R_{ij}} N_{uv} \text{ and } H_{ij} = \sum_{r_{ih} \in R_{ij}} N_{ih}.$$

Then for the ring network, denote $$E_{f_{ij}}\left[\sum_{r_{uv} \in R_{j,j+1}} N_{uv}\right]$$

as $w_{j,j+1}(m,f_{ij},\text{ring})$; denote $$E_{f_{ij}}\left[\sum_{r_{jh}\in R_{j,j+1}} N_{jh}\right] \text{ as } \varpi_{j,j+1}(m, f_{ij}, \text{ring}),$$

where m is the number of nodes in the ring network.

Let $w_{12}(I,\text{bus})$ denote the mean value of $W_{12}$ in an l-node network of bus topology with a route set that includes the route between each pair of nodes, where subscript I denotes the number of nodes in the bus network. Since, $$w_{j,j+1}(m,f_{ij},\text{ring}) = \varpi_{j,j+1}(m,f_{ij},\text{ring}) = w_{12}(m-j+i,\text{bus}), \quad (38)$$

it is sufficient to show that $w_{12}(I,\text{bus})$, $\forall I>1$, increases monotonically with $\gamma$.

Let $\theta = \gamma/(1-\gamma)$ and $W = (W_{ij}: V_i \sim V_j)$. In addition, a configuration of $(N,W)$ with non-zero probability is denoted as a traffic pattern. Let sum(W) denote the summation of all the components in W, then from (24), $$P(N, W) \propto \theta^{sum(W)} \prod_{V_i \sim V_j} I_2\left(W_{ij} = \sum_{r_{uv}\in R_{ij}} N_{uv}\right), \quad (39)$$

where $I_2(A)=1$ if A is true; and $I_2(A)=0$, otherwise. If $(N,W)$ is a traffic pattern, (39) can be simplified as $$P(N,W) \propto \theta^{sum(W)}. \quad (40)$$

Let $T_{(l),bus}$ denote the set of all traffic patterns on the bus network with l nodes (l>1). By counting all possible ways of using link $A_1A_2$, the l-node bus network can be described as follows, $$P(W_{12} = 1) \propto$$
$$\theta \sum_{T_{(l-1),bus}} \theta^{sum(W_{(l-1),bus})} + \theta^2 \sum_{T_{(l-2),bus}} \theta^{sum(W_{(l-2),bus})} + \ldots + \theta^l; \quad (41)$$

$$P(W_{12} = 0) \propto \sum_{T_{(l-1),bus}} \theta^{sum(W_{(k-1),bus})}.$$

Let $$f_l(\theta) = \sum_{T_{(l),bus}} \theta^{sum(W_{(l),bus})}, \forall I > 1, \text{ and } f_1(\theta) = 1.$$

Then, $$P(W_{12}=1) \propto \theta f_{l-1}(\theta) + \theta^2 f_{l-2}(\theta) + \ldots + \theta^l, P(W_{12}=0) \propto f_{l-1}(\theta).$$

Furthermore, the following recursive equations are observed, $$f_1(\theta) = 1; f_2(\theta) = 1 + \theta; f_i(\theta) = (1+2\theta)f_{i-1}(\theta) - \theta f_{i-2}(\theta), \quad (42)$$
$$i = 3, 4, \ldots, I.$$

Then, $$w_{12}(I, \text{bus}) = \begin{cases} \dfrac{\theta}{1+\theta}, & \text{if } I = 2, \\ 1 - \dfrac{f_{l-1}(\theta)}{(1+2\theta)f_{l-1}(\theta) - \theta f_{l-2}(\theta)}, & \text{if } I > 2. \end{cases} \quad (43)$$

Then, $\dfrac{\partial w_{12}(I,\text{bus})}{\partial \theta} > 0$, for $I = 2$. If $I > 2$, $\quad (44)$ $$\frac{\partial w_{12}(I,\text{bus})}{\partial \theta} = \frac{2f'_{l-1}(\theta) + \theta(f'_{l-1}f_{l-2} - f_{l-1}f'_{l-2})}{((1+2\theta)f_{l-1}(\theta) - \theta f_{l-2}(\theta))^2}.$$

$$f'_l f_{l-1} - f_l f'_{l-1} = 2f^2_{l-1} - f_{l-1}f_{l-2} + \theta(f'_{l-1}f_{l-2} - f_{l-1}f'_{l-2}). \quad (45)$$

Since $f_2'f_1 - f_2 f_1' = 2\theta^2 + 4\theta + 1 > 0$, through mathematical induction, from (45), the following is observed $f_l'f_{l-1} - f_l f_{l-1}' > 0$, $\forall I > 1$, and $$\frac{\partial w_{12}(I, \text{bus})}{\partial \theta} > 0, \forall I > 1. \quad (46)$$

Since $\theta = \gamma/(1-\gamma)$, and $0 < \theta < 1$, it follows that $$\frac{\partial w_{12}(I, \text{bus})}{\partial \gamma} > 0, \forall I > 1.$$

From Proposition 1, $M_{f_{ij}}$ monotonically increases in $\rho$ for the ring network.

The upper and lower bound of $M_{f_{sd}}$ in (36) is obtained by showing that $$\gamma \leq w_{j,j+1}(m,f_{ij},\text{ring}) \leq \rho. \quad (47)$$

For an arbitrary network topology G(V,E), if $r_{ij} \in R$, i.e., there is one route from node $V_i$ to $V_j$ in R, where $V_i \in V_{f_{sd}}$, $V_j \notin V_{f_{sd}}$, and $V_i \sim V_j$, then, $$E_{f_{sd}}[W_{ij}] \geq \gamma, \quad (48)$$

Hence, the ring network considered here satisfies the condition in (48).

Let $E_1$ be the set of links that are not traversed by flow $f_{sd}$: $E_1 = \{e_{ij}: V_i \sim V_j, r_{sd} \notin R_{ij}\}$. Let $R_1$ be the set of routes in R that only traverse links in $E_1$. Let $E_2 = E_1 \setminus \{e_{ij}\}$, and $R_2$ be the set of routes in R that only traverse links in $E_2$. Hence, $R_2 \subset R_1 \subset R$, if $r_{ij} \in R$.

Let $T_{E_1} = \{(N_{E_1}, W_{E_1})\}$ be the set of traffic patterns restricted to a network formed by link set $E_1$ with route set $R_1$. Let $T_{E_2} = \{(N_{E_2}, W_{E_2})\}$ be the set of traffic patterns restricted to a network formed by link set $E_2$ with route set $R_2$. Then, $$E_{f_{sd}}[W_{ij}] = \frac{\theta Z_1(\theta) + Z_2(\theta)}{(1+\theta)Z_1(\theta) + Z_2(\theta)}, \quad (49)$$

where $$Z_1(\theta) = \sum_{T_{E_2}} \theta^{sum(W_{E_2})}, Z_2(\theta) = \sum_{T_{E_1}} \theta^{sum(W_{E_1})} - (1+\theta)Z_1(\theta).$$

In addition, $Z_2(\theta) > 0$ if there is a route that traverses link ij and one or more links in set $E_2$; $Z_2(\theta) = 0$, otherwise.

Since $Z_1(\theta) > 0$, the following is observed $$E_{f_{sd}}[W_{ij}] \geq \frac{\theta}{1+\theta} = \gamma. \quad (50)$$

To show that $w_{j,j+1}(m,f_{ij},\text{ring}) \leq \rho$, from (38), it suffices to show that $$w_{12}(m-j+1,\text{bus}) \leq \rho, \quad (51)$$

which can be proved through the following two lemmas.

$$w_{12}(I,\text{bus}) \leq w_{12}(I+1,\text{bus}), \forall I>1. \quad \text{Lemma 1:}$$

$$w_{12}(m,\text{bus}) \leq \rho, \forall m>1. \quad \text{Lemma 2:}$$

Lemma 1 and 2 are proved using induction similarly as in the proof of (46). Detailed proof is omitted here. Using (47), (36) can be obtained from (35).

Point 2: For a star network, assume that the route set R consists of the routes between each pair of nodes in the network. Let m, m>1, be the number of nodes in the network. Let the hub node be denoted as $V_m$. Then, $M_{f_{sd}}$ monotonically increases in $\rho$. In particular, $M_{f_{sd}}$ satisfies $$M_{f_{sd}} \geq \begin{cases} 3+\alpha+(m-2)\alpha\gamma, & \text{if } f_{sd}=f_{A_iA_m}, i=1,\ldots,m-1, \\ 3+\alpha+(m-2)\gamma, & \text{if } f_{sd}=f_{A_mA_i}, i=1,\ldots,m-1, \\ 4+\alpha+\alpha^2+(m-3)\alpha\gamma, & \text{otherwise,} \end{cases} \quad (52)$$

$$M_{f_{sd}} \leq \begin{cases} 3+\alpha+2(m-2)\alpha\rho, & \text{if } f_{sd}=f_{A_iA_m}, i=1,\ldots,m-1, \\ 3+\alpha+2(m-2)\rho, & \text{if } f_{sd}=f_{A_mA_i}, i=1,\ldots,m-1, \\ 4+\alpha+\alpha^2+2(m-3)\alpha\rho, & \text{otherwise.} \end{cases} \quad (53)$$

Furthermore, for $0<\rho\ll 1$, the bounds are tight, and $$M_{f_{sd}} = \quad (54)$$

$$\begin{cases} 3+\alpha+2(m-2)\alpha\rho+o(\rho), & \text{if } f_{sd}=f_{A_iA_m}, i=1,\ldots,m-1, \\ 3+\alpha+2(m-2)\rho+o(\rho), & \text{if } f_{sd}=f_{A_mA_i}, i=1,\ldots,m-1, \\ 4+\alpha+\alpha^2+2(m-3)\alpha\rho+o(\rho), & \text{otherwise,} \end{cases}$$

Proofs of Point 2 with regard to star networks can be explained as follows. For a network of star topology with m nodes, m>2, and a route set R that consists of the routes between each pair of nodes. Let node $V_m$ be the hub node of the star network. Let $$W_{ij} = \sum_{r_{uv} \in R_{ij}} N_{uv} \text{ and } H_{ij} = \sum_{r_{ih} \in R_{ij}} N_{ih}.$$

When the attack is started on flow $f_{1m}$, $w_{mi}(m,f_{1m},\text{star}) + \varpi_{mi}(m,f_{1m},\text{star})$, $i=2,\ldots,m-1$, increases monotonically with $\gamma$, where $$w_{mi}(m, f_{1m}, \text{star}) = E_{f_{1m}}\left[\sum_{r_{uv} \in R_{mi}} N_{uv}\right],$$

and $$\varpi_{mi}(m, f_{1m}, \text{star}) = E_{f_{1m}}\left[\sum_{r_{mh} \in R_{mi}} N_{mh}\right].$$

Let $T_{(l),\text{star}}$ denote the set of all traffic patterns on the star network with l nodes. By counting all possible ways of using link mi, it can be found that, for the l-node star network, $$P(W_{mi}=1|R_f=f_{1m}) \propto \quad (55)$$

$$\theta \sum_{T_{(m-1),\text{star}}} \theta^{\text{sum}(W_{(m-1),\text{star}})} + (m-2)\theta^2 \sum_{T_{(m-2),\text{star}}} \theta^{\text{sum}(W_{(m-2),\text{star}})};$$

$$P(W_{mi}=0|R_f=f_{1m}) \propto \sum_{T_{(m-1),\text{star}}} \theta^{\text{sum}(W_{(m-1),\text{star}})}; \quad (56)$$

$$P(H_{mi}=1|R_f=f_{1m}) \propto \theta \sum_{T_{(m-1),\text{star}}} \theta^{\text{sum}(W_{(m-1),\text{star}})}; \quad (57)$$

$$P(H_{mi}=0|R_f=f_{1m}) \propto \quad (58)$$

$$\sum_{T_{(m-1),\text{star}}} \theta^{\text{sum}(W_{(m-1),\text{star}})} + (m-2)\theta^2 \sum_{T_{(m-2),\text{star}}} \theta^{\text{sum}(W_{(m-2),\text{star}})}.$$

Let $$t_1 = 1 \text{ and } t_l(\theta) = \sum_{T_{(l),\text{star}}} \theta^{\text{sum}(W_{(l),\text{star}})}, l>1.$$

Then, the following recursive equations are observed, $$t_2 = 1+\theta; \, t_l = (1+\theta)t_{l-1} + (l-2)\theta^2 t_{k-2}, \forall l>2.$$

Therefore, from (55)-(58), $$w_{mi}(m, f_{1m}, \text{star}) + \varpi_{mi}(m, f_{1m}, \text{star}) = \quad (59)$$

$$1 + \frac{(\theta-1)t_{m-1}}{(1+\theta)t_{m-1}+(m-2)\theta^2 t_{m-2}}.$$

Through induction similarly as in the proof of (46), $$\frac{\partial \{w_{mi}(m, f_{1m}, \text{star}) + \varpi_{mi}(m, f_{1m}, \text{star})\}}{\partial \gamma} > 0.$$

Similarly, when the attack is started from flow $f_{A_1A_2}$, it can be shown that $$\frac{\partial \{w_{mi}(m, f_{12}, \text{star}) + \varpi_{mi}(m, f_{12}, \text{star})\}}{\partial \gamma} > 0.$$

Thus, from (35), it follows that $M_{f_{ij}}$ monotonically increases in $\rho$ for the star network. The upper and lower bound of $M_{f_{sd}}$ in (52) and (53) is obtained by showing that $$\gamma < w_{mi}(m,f_{1m},\text{star}) + \varpi_{mi}(m,f_{1m},\text{star}) \leq 2\rho,$$

$$\gamma < w_{mi}(m,f_{12},\text{star}) + \varpi_{mi}(m,f_{12},\text{star}) \leq 2\rho. \quad (60)$$

Since $$\varpi_{mi}(m,f_{1m},\text{star}) \leq w_{mi}(m,f_{1m},\text{star})$$

and $$\varpi_{mi}(m,f_{12},\text{star}) \leq w_{mi}(m,f_{12},\text{star}), \quad (61)$$

Equation (60) can be obtained by showing $$\gamma \leq w_{mi}(m,f_{1m},\text{star}) \leq \rho,$$

$$\gamma \leq w_{mi}(m,f_{12},\text{star}) \leq \rho. \quad (62)$$

The proof of (62) is similar to that of (47), and is omitted.

Referring to point 2, $M_{f_{sd}}$ generally is the sum of two terms: e.g. in (62) below, (3+α) that corresponds to the number of affected channels used by flows on the attacker's route; and ($2(m-2)\alpha\rho+o(\rho)$) that corresponds to the number of affected channels used by flows not on the attacker's route.

$M_{f_{sd}}$ is compared for ring and star networks. In both cases, $M_{f_{sd}}$ is linearly increasing in $\rho$ for $0<\rho\ll1$. However, for ring networks, $M_{f_{sd}}$ is polynomially increasing in $\alpha$; whereas for star networks, $M_{f_{sd}}$ is linearly increasing in $\alpha$. For ring networks, $M_{f_{sd}}$ is linearly increasing in k (the number of nodes in $V_{f_{sd}}$). For star networks, $M_{f_{sd}}$ is linearly increasing in m (the number of nodes in the network).

In the description that follows, a focus is placed on the impact of network load $\rho$ on the average network resilience loss (M), which is the mean value of network resilience loss over all possible source of attacks. Consider a ring network with m, m>1, nodes, $V_1, V_2, \ldots, V_m$, and a route set R that includes all the two link-disjoint paths between each pair of nodes in the network. Then, the following equations can be presented:

Point 3:

$$M_{ring,m} = \frac{1}{m-1}\sum_{i=1}^{m-1} a_i M_{f_{1i+1}}, \tag{63}$$

where $a_i = P(N_{1i+1}=1)$ is the probability that a connection with i links between two terminal nodes, $V_1$ and $V_{i+1}$, is active, and $M_{f_{1i+1}}$ is the network resilience loss when the attack is started from flow $f_{1i+1}$.

Furthermore, the following can be presented:

$$a_i = \theta^i f_{m-i+1}/g_m, \tag{64}$$

$$\theta = \gamma/(1-\gamma), \tag{65}$$

$$f_m = \frac{\sqrt{1+4\theta^2}+1}{2\sqrt{1+4\theta^2}}\left(\frac{1+2\theta+\sqrt{1+4\theta^2}}{2}\right)^{m-1} + \frac{\sqrt{1+4\theta^2}-1}{2\sqrt{1+4\theta^2}}\left(\frac{1+2\theta-\sqrt{1+4\theta^2}}{2}\right)^{m-1}, \tag{66}$$

$$g_m = f_m + \sum_{j=1}^{m-1} j\theta^j f_{m+1-j}, \quad m > 1. \tag{67}$$

Detailed proof of Point 3 can be explained as follows. First, $a_i = P(N_{1i+1}=1)$ is described. Through solving the difference equation in (42), (66) can be proved.

Let $T_{(I),ring}$ be the set of all traffic patterns on a ring network with I nodes and a route set that includes all possible link-disjoint shortest paths between each pair of nodes in the network. Let $$g_m = \sum_{T_{(m),ring}} \theta^{sum(W_{(m),ring})}.$$

By counting different ways of using one single link in the ring network, the following is observed:

$$g_k = f_k + \theta f_{k-1} + 2\theta f_{k-1} + \ldots + (k-1)\theta^{k-1} f_2. \tag{68}$$

Therefore, $a_i = P(N_{A_1 A_{i+1}} = 1) = \theta^i f_{k-i+1}/g_k$. Using the lower and upper bound of $M_{f_{sd}}$ for the ring network in (36), 3 is obtained.

Using Point 1, the following bounds are observed:

$$M_{ring,m} \geq \frac{1}{(m-1)}\sum_{i=1}^{m-1}\left\{a_i\left(i+1+\sum_{j=0}^{i}\alpha^j + 2(1+\alpha^i)\gamma\right)\right\}, \tag{69}$$

$$M_{ring,m} \leq \frac{1}{(m-1)}\sum_{i=1}^{m-1}\left\{a_i\left(i+1+\sum_{j=0}^{i}\alpha^j + 2(1+\alpha^i)\rho\right)\right\}, \tag{70}$$

The difference between the upper and the lower bound of $M_{ring,m}$ is $O((\rho-\gamma)/m)$. Furthermore, (63) can be simplified as follows:

$$M_{ring,m} = \rho M_{f_{A_1 A_2}}/(m-1) + o(\rho), \text{ as } \rho \to 0. \tag{71}$$

$$M_{ring,m} = \sum_{i=1}^{m-1}\frac{1}{2^i} M_{f_{A_1 A_{i+1}}}/(m-1), \text{ as } \rho \to 1, m \to \infty. \tag{72}$$

Then, the following can be described:

$$M_{ring,m} = \rho(3+\alpha)/(m-1) + o(\rho), \text{ as } \rho \to 0, \tag{73}$$

which shows that, when the network load is low, $M_{ring,m}$ increases almost linearly with $\rho$ and $\alpha$; and is in the order of $O(\rho/m)$.

When the network load is high, the following can be described:

$$M_{ring,m} = \tag{74}$$

$$\frac{1}{m-1}\left\{\sum_{i=1}^{m-1}\frac{1}{2^i}\left(i+1+\sum_{j=0}^{i}\alpha^j + 2(1+\alpha^i)\right)\right\}, \text{ as } \rho \to 1, m \to \infty.$$

Furthermore, if $\alpha=1$, (74) can be simplified as follows:

$$M_{ring,m} = \frac{1}{m-1}\left(10 - \frac{2m+8}{2^{m-1}}\right), \tag{75}$$

which shows that $M_{ring,m}$ is in the order of $O(1/m)$.

Next consider a star network with m nodes, $V_1, V_2, \ldots, V_m$, where $V_m$ is the hub node of the star network; and a route set R that includes all the link-disjoint paths between each pair of nodes in the network. It follows that, Point 4:

$$M_{star,m} = \frac{b_1(M_{f_{A_1 A_k}} + M_{f_{A_k A_1}}) + 2b_2(m-2)M_{f_{A_1 A_2}}}{2(m-1)}, m > 3, \tag{76}$$

where $b_1 = P(N_{A_1 A_k} = 1)$, $b_2 = P(N_{A_1 A_2} = 1)$ with
$b_1 = \theta t_{m-1}/t_m$; $b_2 = \theta^2 t_{m-2}/t_m$; $t_1 = 1$; $t_2 = 1+\theta$; $t_i = (1+\theta)t_{i-1} + (i-2)\theta^2 t_{i-2}, \forall i > 2$.

Detailed proof of Point 4 can be explained as follows. From (55)-(58), $P(N_{1m}=1)=\theta t_{k-1}/t_k$; $P(N_{A_1 A_2}=1)=\theta^2 t_{m-2}/t_m$; $\forall k>3$.

Using the lower and upper bound of $M_{f_{sd}}$ for the star network in (52) and (53), Point 4 can be obtained.

Furthermore, using Point 2, the following bounds for $M_{star,m}$ are observed $$M_{star,m} \geq \frac{1}{2(m-1)}\{b_1(4+(1+\alpha)(2+(m-2)\gamma))+ \qquad (77)$$
$$2b_2(m-2)(4+\alpha+\alpha^2+(m-3)\alpha\gamma)\},$$

$$M_{star,m} \leq \frac{1}{2(m-1)}\{b_1(4+2(1+\alpha)(1+(m-2)\rho))+ \qquad (78)$$
$$2b_2(m-2)(4+\alpha+\alpha^2+2(m-3)\alpha\rho)\}.$$

The difference between the upper and the lower bound of $M_{star,m}$ is $O(\alpha(2\rho-\gamma))$ when m is large, since $b_2$ is $O(1/m)$. In addition, when the network load is low, $$M_{star,m} = \rho(3+\alpha)/m + o(\rho), \text{ as } \rho \to 0, \qquad (79)$$

which shows that $M_{star,m}$ is $O(\rho/m)$; and increases linearly with $\alpha$.

When the network load is high ($\rho \to 1$), the following can be presented:

$$M_{star,m} = O(\alpha\rho), \text{ as } \rho \to 1, \qquad (80)$$

which shows that, when the star network is under high load, $M_{star,m}$ increases linearly with $\alpha$.

For a general network $G(V,E)$ with a fixed set of route R, the following upper bound for M can be described:
Point 5:

$$M \leq \frac{1}{|R|} \max_{f_{sd}} \{M_{f_{sd}}\} \rho |E|, \qquad (81)$$

where $|E|$ is the cardinality of the set of edges in the network; $|R|$ is the cardinality of the route set R. The proof of point 5 can be explained as follows. Since $$M = \sum_{f_{sd}} M_{f_{sd}} P(N_{sd} = 1)/2|R|,$$

the following is observed:

$$M \leq \frac{\sum_{f_{sd}} P(N_{sd}=1)}{2|R|} \max_{f_{sd}} \{M_{f_{sd}}\}. \qquad (82)$$

Let $N = (N_{sd} : r_{sd} \in R)$, and $E[\ ]$ stands for expectation. Since each connection consists of two flows, then $$\sum_{f_{sd}} P(N_{sd} = 1) = 2\text{sum}(N).$$

Thus, to prove Point 5, it suffices to show that $$E(\text{sum}(N)) \leq \rho |E|.$$

The following is observed:

$$E[\text{sum}(N)] = \sum_{W} E[\text{sum}(N)|W] P(W),$$

-continued where $$W = (W_{ij}, i \sim j).$$

Since $E[\text{sum}(N)|W] \leq E[\text{sum}(W)|W]$, $$E(\text{sum}(N)) \leq E(\text{sum}(W)). \qquad (83)$$

As $E[\text{sum}(W)] = \rho|E|$, from (83), $$E(\text{sum}(N)) \leq \rho|E|.$$

It follows that $$M \leq \frac{1}{|R|} \max_{f_{sd}} \{M_{f_{sd}}\} \rho |E|.$$

In (81), $\rho|E|/|R|$ corresponds to the upper bound of the probability that the crosstalk attack occurs in the network, and is accurate when the network route set R only consists of routes with link-length 1. The bound in (81) provides a worst case estimation of M.

Furthermore, suppose that all the routes in the set R are of the same link length l. Then the probability that a crosstalk attack happens in the network is $(\rho|E|)/(l|R|)$, and (81) can be refined as follows:

$$M \leq \frac{1}{|R|l} \max_{f_{sd}} \{M_{f_{sd}}\} \rho |E|. \qquad (84)$$

When the length of each network route and the network resilience loss $M_{f_{sd}}$ are the same for each possible source of attack, the equality in (84) holds. Point 5 suggests the upper bound of average network resilience loss is affected by the following factors:

(1) The network load in the network. The upper bound in (84) increases at least linearly with $\rho$.

(2) The number of links in the network. The larger the number of links in the network, the less resilient the network. The upper bound in (84) increases linearly with the number of links in the network.

(3) The number of routes in the network. The larger the number of routes in the network, the more resilient the network. This is because the probability for a route to be chosen as the attacker's route is smaller.

Next Equation (81) is used to study a mesh-torus network with m nodes and a route set R, which includes: (1) the unique link-shortest route between each pair of nodes if applicable; and (2) one shortest route between each pair of nodes, which forms the border of the sub-grid with the two nodes at the diagonally opposite corners.

Point 6 can be expressed as follows:

$$\max_{f_{sd}} \{M_{f_{sd}}\} \leq \begin{cases} \frac{6(1-\alpha^{\sqrt{m}+1})}{(1-\alpha)} + 4, & \text{if } \alpha \neq 1, \\ 6\sqrt{m} + 4, & \text{otherwise}. \end{cases} \qquad (85)$$

Then, from (81), $$M_{torus,m} \leq \frac{2m\rho}{m(m-1)} \max_{f_{sd}} \{M_{f_{sd}}\}, \qquad (86)$$

$$M_{torus,m} \leq \begin{cases} \frac{2\rho}{(m-1)}\left(\frac{6(1-\alpha^{\sqrt{m}+1})}{(1-\alpha)}+4\right), & \text{if } \alpha \neq 1, \\ \frac{2\rho}{(m-1)}6\sqrt{m}+4, & \text{otherwise.} \end{cases}$$

Furthermore, when $\rho \to 0$, it can be found that $$M_{torus,m} = \rho(3+\alpha)/(m-1)+o(\rho), \text{ as } \rho \to 0. \quad (87)$$

A comparison of the average network resilience loss for ring, star and mesh networks is shown in Table III below. The following can be observed:

(1) When the network load is low ($0<\rho<<1$), M is $O(\rho/m)$. This is because when the load is close to zero (0), the network is most likely in either of two states: (a) there is no active connection in the network; or (b) there is an active connection of link length 1. Specifically, with probability $O(\rho)$, the attack is started on a route of link length 1; with probability $o(\rho)$, the attack is started on a route of longer lengths. For instance, as each route is the attacker's route with equal probability, the attack starts on routes of link length 1 in the mesh-torus network with probability $2\rho/(m-1)$ and $M_{f_{sd}}=(3+\alpha)+o(\rho)$ if $\rho<<1$.

(2) When the network load is high ($\rho \to 1$), the star network is the least resilient, with M being $O(\alpha)$. This is because, for the star network, nodes in the set $V_{f_{sd}}$, $\forall r_{sd} \in R$, has the most number of neighboring links. Ring and mesh-torus networks show good network resilience in $O(\rho/m)$.

TABLE III

| Average Network Resilience Loss (M) | | |
|---|---|---|
| M | $\rho \to 0$ | $\rho \to 1$ |
| Ring network | $\rho(3 + \alpha)/(m - 1)$ | $O(1/m)$ |
| Star network | $\rho(3 + \alpha)/m$ | $O(\alpha)$ |
| Mesh-torus | $2\rho(3 + \alpha)/(m - 1)$ | $\begin{cases} O(1/(1-\alpha)m), & \text{if } \alpha \neq 1, \\ O(1/\sqrt{m}), & \text{otherwise.} \end{cases}$ |

For networks with irregular topologies, the sum-product algorithm on the factor graph is used. The sum-product algorithm is then compared with the exact resilience calculation through enumerations of all network traffic patterns. Enumeration has the computational complexity exponential in the number of routes, and is thus not applicable to networks with even a medium number of routes. The computational complexity of the sum-product algorithm is exponential in the maximum nodal degree of the factor graph for the worst case, and is thus much more efficient than enumeration. The sum-product algorithm provides exact results when the factor graph has no loops, and provides approximate results otherwise.

When there are a large number routes in the set R, to further reduce the computational complexity of the sum-product algorithm, the following intermediate variables can be introduced:

$$W_{ij} = \sum_{r_{uv} \in R_{ij}} N_{uv}, W_{ij} \in \{0, 1\}, \quad (1)$$

which is the number of flows that enter the switching plane of node $V_i$ through link ij;

$$H_{ij} = \sum_{r_{ih} \in R_{ij}} N_{ih}, H_{ij} \in \{0, 1\}, \quad (2)$$

which is the number of flows locally originated at node i and leave node $V_i$ through link ij. Then the factor graph representation can be transformed accordingly. On the other hand, it is possible to transform factor graphs with loops into loop-free factor graphs, so that exact results can be obtained using the sum-product algorithm, sometimes at the cost of computational complexity.

Figure 8A:
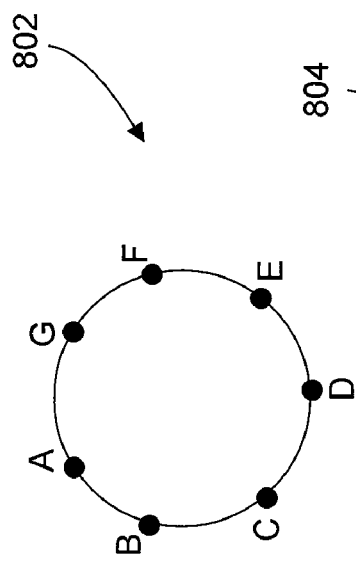
FIGS. 8A-8C are schematic diagrams that illustrate exemplary ring, double-ring, and mesh networks.
Figure 8B:
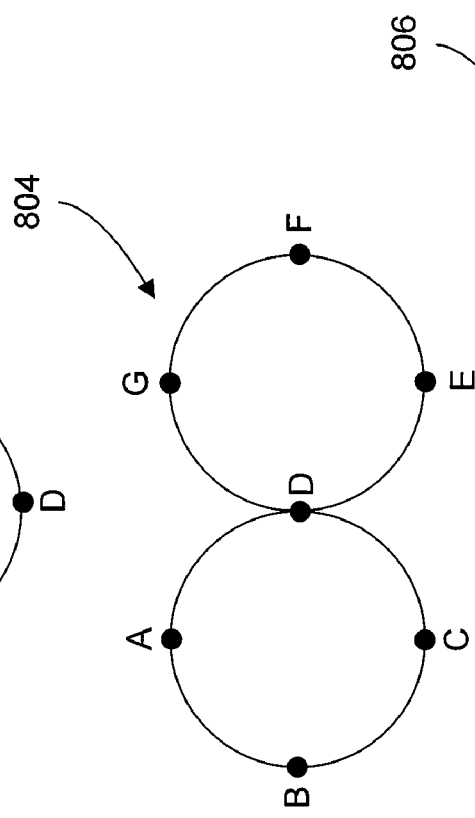
Figure 8C:
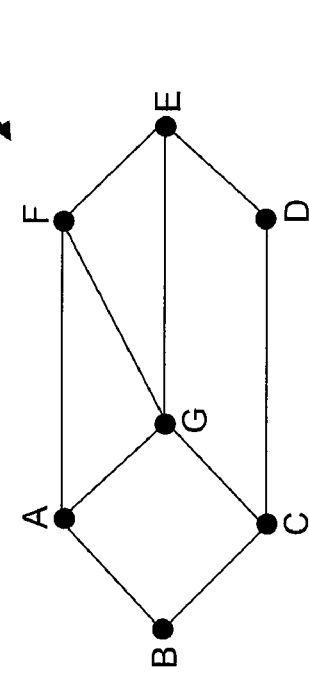

Consider the three networks shown in FIG. 8A-8C. Shown is a ring network 802, double-ring network 804, and a mesh network 806. In each network, consider that the route set has 21 routes, which corresponds to one link-shortest route between each pair of nodes. Using the sum-product algorithm, network resilience loss is computed given the source of attack $M_{f_{sd}}$ for each $f_{sd}$. Then, the sum-product algorithm is used to find the probability of $P(N_{sd}=1)$. Finally, (2) is used to compute the average network resilience loss.

Figure 9:
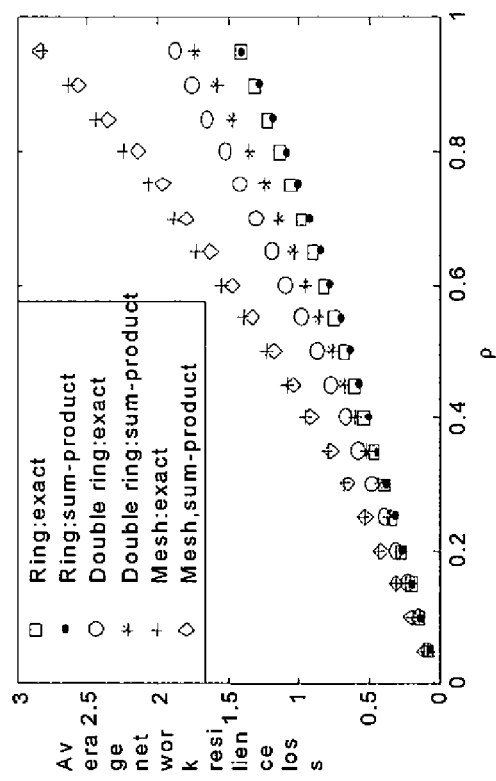
FIG. 9 is a graph diagram that illustrates average network resilience loss versus network load for the three networks shown in FIGS. 8A-8C.
Figure 9:

FIG. 9 provides a graph 900 that depicts the relationship between $\rho$ and average network resilience loss M for the networks 802 (ring), 804 (double ring), and 806 (mesh) in 8A-8C, respectively, with $\alpha=0.6$. It can be observed that:

(1) M monotonically increases with $\rho$, in networks with all-to-all traffic and link-shortest path routing. Moreover, for low loads, M increases linearly with $\rho$.

(2) The sum-product algorithm results in an almost exact M for the mesh and ring networks, even though the factor graph representations contain loops. The performance of sum-product algorithm is not as accurate, yet acceptable for the double-ring network. This suggests that the sum-product algorithm can be used for large networks where exact calculation of resilience is infeasible.

Figure 10:
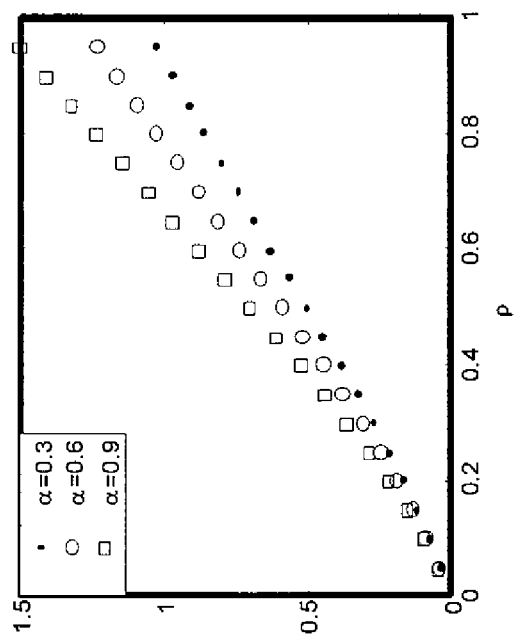
FIG. 10 is a graph diagram that illustrates an average network resilience loss versus network load for a National Science Foundation (NSF) benchmark network topology.
Figure 10:
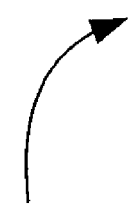

The sum-product algorithm can be used to study the network resilience for the well-known benchmark National Science Foundation Network (NSF) network topology with 14 nodes and 21 bi-directional links. Assume that there is one link-shortest route between each pair of nodes in the networks. Then, there are 91 routes in R. The corresponding factor graph representation contains loops, and thus the sum-product algorithm provides an approximation for M. FIG. 10 shows a graph 1000 that reflects the relationship between $\rho$ and M for the NSF network topology with $\alpha=0.3, 0.6, 0.9$. The graph 1000 in FIG. 10 suggests that, if the set of network routes consists of one link-shortest route between each pair of nodes in the network, M generally increases with the network load. Furthermore, when the network load is low, M increases linearly with $\rho$.

As described above, several factors from both the physical- and the network layer that affect the resilience have been explored. Factors from the physical-layer include: (1) the physical-layer vulnerability, parameters in Bayesian Belief Network that characterize how likely the attack propagates, and (2) the physical topology. Factors from the network layer include active network connections that are characterized using network load, e.g., the probability that the wavelength, on which the attack is initiated, is used in the network. For all the topologies disclosed herein, it has been demonstrated that the average network resilience loss increases linearly with respect to the physical-layer vulnerability and light network load under link-shortest routing, and all-to-all traffic. In addition, ring and mesh-torus network show good resilience, which are inversely proportional to the number of the nodes in the network. Numerical results also suggest that for networks with link-shortest routing and all-to-all traffic, the network resilience loss increases at least linearly with respect to the network load.

There are several benefits resulting from the cross-layer model based on graphical models. For instance, the cross-layer model provides an explicit representation of the dependencies and interactions between the physical- and the network layer. In addition, the cross-layer model facilitates the analytical investigation of network resilience for ring, star, and special cases of mesh topologies. Further, the cross-layer model facilitates the implementation of computationally efficient approaches, e.g. the sum-product algorithm, for evaluating network resilience. Compared to previous work by the inventors reflected by the March 2005 publication, "Probabilistic Graphical Models for Resilience of All-Optical Networks under Crosstalk Attacks," the determination of resilience as described herein is more meaningful. For instance, in the various embodiments described herein, resilience is measured based on the number of affected wavelength channels at each node. Hence, the measurements reveal not only whether a network node is affected by an attack or not, but also quantifies how many wavelength channels are affected at a particular node. In other words, the measure of resilience as herein described characterizes the level of damage to each affected node. This quantifying measure is revealed in FIG. 7, where the variable S at the middle of the factor graph 700 combines both the status of each route (network layer model) and the status of each node (physical layer model). In contrast, the March 2005 publication discloses a method that measures the resilience based on the percentage of nodes affected in the network, which does not provide such quantifying measures or characterization of node damage.

Figure 11:
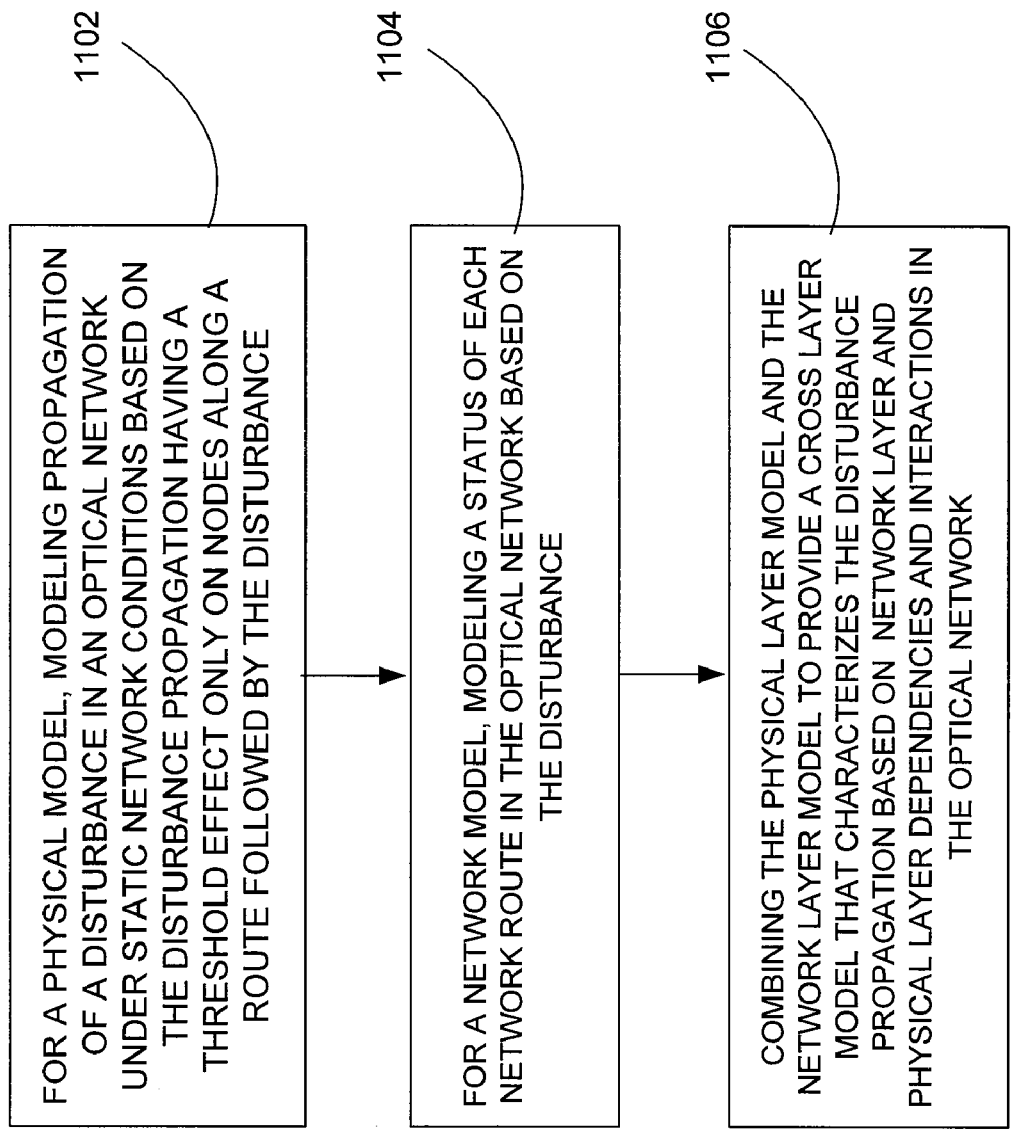
FIG. 11 is a flow diagram that illustrates an embodiment of an optical network evaluation method.

In view of the above description, it should be appreciated that one method embodiment 200a, as shown in FIG. 11, comprises for a physical model, modeling propagation of a disturbance in an optical network under static network conditions based on the disturbance propagation having a threshold effect only on nodes along a route followed by the disturbance (1102), for a network model, modeling a status of each network route in the optical network based on the disturbance (1104), and combining the physical layer model and the network layer model to provide a cross layer model that characterizes the disturbance propagation based on network layer and physical layer dependencies and interactions in the optical network (1106).

Any process descriptions or blocks in flow charts should be understood as representing modules, segments, or portions of code which include one or more executable instructions for implementing specific logical functions or steps in the process, and alternate implementations are included within the scope of the preferred embodiments of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

At least the following is claimed:

1. A computer-implemented method for optical network evaluation, comprising:
for a physical model, modeling propagation of a disturbance in an optical network under static network conditions based on the disturbance propagation having a threshold effect only on nodes along a route followed by the disturbance, the modeling implemented by a computer;
for a network model, modeling a status of each network route in the optical network based on the disturbance, the modeling implemented by the computer; and
combining the physical layer model and the network layer model to provide a cross layer model that characterizes the disturbance propagation based on network layer and physical layer dependencies and interactions in the optical network, the combining implemented by the computer, wherein modeling the status comprises determining a probability distribution of active connections in the optical network and the number of affected wavelength channels, the modeling implemented by the computer;
wherein all active wavelength channels in the switching plane of node $V_j$ are affected if node $V_i$ is affected by the disturbance, wherein $$\sum_{V_j - V_i} \left\{ \sum_{r_{uv} \in R_{ij}} n_{uv} + \sum_{r_{ih} \in R_{ij}} n_{ih} \right\}$$

corresponds to the total number of active wavelength channels in the switching plane of node $V_i$, $$\sum_{r_{uv} \in R_{ij}} n_{uv}$$

corresponds to the number of flows that enter the switching plane of node $V_i$ through link ij, and $$\sum_{r_{ih} \in R_{ij}} n_{ih}$$

corresponds to the number of flows that are locally originated from node $V_i$ and enter the network through link ij.

2. The method of claim 1, further comprising determining resilience of the optical network based on the cross layer model, the determining implemented by the computer.

3. The method of claim 1, wherein the physical model is represented by a directed graph.

4. The method of claim 1, wherein the network model is represented by an undirected probabilistic graph.

5. The method of claim 1, further comprising displaying the cross layer model as a factor graph representation.

6. The method of claim 1, wherein the disturbance comprises crosstalk.

7. The method of claim 1, wherein the optical network is an all optical network.

8. The method of claim 1, wherein the physical layer model comprises the following equation:

$$P(X_{f_{sd}}, S_{f_{sd}} | N = n, R_f = f_{sd}) =$$

-continued $$\prod_{i=1}^{k-1} P(X_{i+1}|X_i, R_f = f_{sd}) \prod_{i=1}^{k} P(S_i|X_i, N = n, R_f = f_{sd}),$$

where $S_{f_{sd}} = (S_i: V_i \in V_{f_{sd}})$, and $X_{f_{sd}} = (X_i: V_i \in V_{f_{sd}})$ k is the number of nodes in $V_{f_{sd}}$, wherein the physical layer model includes the probability of the number of channels affected S at each network node V given the status X of network routes n and the source of attack $R_f$, where $R_f$ denotes the unidirectional flow $f_{sd}$ where the attack originates.

9. The method of claim 8, wherein the network layer model comprises the following equation:

$$P(N) = \frac{1}{Z_N} \prod_{(V_i \sim V_j)} \gamma_{ij} \sum_{r_{uv} \in R_{ij}} N_{uv}(1-\gamma_{ij})^{(1-\Sigma r_{uv} \in R_{ij} N_{uv})} l_1\left(\sum_{r_{uv} \in R_{ij}} N_{uv}\right),$$

where $l_1\left(\sum_{r_{uv} \in R_{ij}} N_{uv}\right) = 1$ if $\sum_{r_{uv} \in R_{ij}} N_{uv} = 0$ or $1$;

and $l_1\left(\sum_{r_{uv} \in R_{ij}} N_{uv}\right) = 0$, otherwise;

wherein $\sum_{r_{uv} \in R_{ij}} N_{uv}$ is the total number of active connections using wavelength $\lambda$ on link ij; $\gamma_{ij}$ comprises a weight of using wavelength $\lambda$ at link ij, wherein a potential function of a clique associated with link ij is $\gamma_{ij}$ if wavelength $\lambda$ is used at link ij; and $1-\gamma_{ij}$ if wavelength $\lambda$ is not used at link ij, wherein $Z_N$ is a normalization constant.

10. The method of claim 9, wherein the cross layer model comprises the following equation:

$$P(X_{f_{sd}}, S_{f_{sd}}, N|R_f = f_{sd}) = P(S_{f_{sd}}, X_{f_{sd}}|N, R_f = f_{sd})P(N|R_f = f_{sd}),$$

where $X_{f_{sd}} = (X_i: V_i \in V_{f_{sd}})$ and $S_{f_{sd}} = (S_i: V_i \in V_{f_{sd}})$, $P(S_{f_{sd}}, X_{f_{sd}}|N, R_f = f_{sd})$ corresponds to the physical layer model, which characterizes the probability distribution of the status and the number of affected channels at each node on the attacker's route given the status of each route and the source of attack, $P(N|R_f = f_{sd})$ corresponds to the network layer model, which characterizes the probability distribution of the status of each network route given the source of attack.

11. A system, comprising:
a processor; and
memory including executable instructions that, when implemented by the processor:
provide a cross layer model of disturbance propagation of a disturbance in an optical network by combining a physical layer model of the optical network and a network layer model of the optical network, the physical layer model based on the disturbance propagation having a threshold effect only on nodes along a route followed by the disturbance;
provide the physical layer model of the optical network, wherein the physical layer model comprises the following equation:

$$P(X_{f_{sd}}, S_{f_{sd}}|N = n, R_f = f_{sd}) =$$

-continued $$\prod_{i=1}^{k-1} P(X_{i+1}|X_i, R_f = f_{sd}) \prod_{i=1}^{k} P(S_i|X_i, N = n, R_f = f_{sd}),$$

where $S_{f_{sd}} = (S_i: V_i \in V_{f_{sd}})$, and $X_{f_{sd}} = (X_i: V_i \in V_{f_{sd}})$, wherein the physical layer model includes the probability of the number of channels affected S at each network node V given the status X of network routes n and the source of attack $R_f$, where $R_f$ denotes the unidirectional flow $f_{sd}$ where the attack originates; and
determine resilience of the optical network based on the cross layer mode.

12. The system of claim 11, wherein the executable instructions when implemented by the processor, provide the network layer model of the optical network, the network layer model comprising the following equation:

$$P(N) = \frac{1}{Z_N} \prod_{(V_i \sim V_j)} \gamma_{ij} \sum_{r_{uv} \in R_{ij}} N_{uv}(1-\gamma_{ij})^{(1-\Sigma r_{uv} \in R_{ij} N_{uv})} l_1\left(\sum_{r_{uv} \in R_{ij}} N_{uv}\right),$$

where $l_1\left(\sum_{r_{uv} \in R_{ij}} N_{uv}\right) = 1$ if $\sum_{r_{uv} \in R_{ij}} N_{uv} = 0$ or $1$; and $$l_1\left(\sum_{r_{uv} \in R_{ij}} N_{uv}\right) = 0,$$

otherwise, wherein $$\sum_{r_{uv} \in R_{ij}} N_{uv}$$

is the total number of active connections using wavelength $\lambda$ on link ij; $\gamma_{ij}$ comprises a weight of using wavelength $\lambda$ at link ij, wherein a potential function of a clique associated with link ij is $\gamma_{ij}$ if wavelength $\lambda$ is used at link ij; and $1-\gamma_{ij}$ if wavelength $\lambda$ is not used at link ij, wherein $Z_N$ is a normalization constant.

13. The system of claim 12, wherein the executable instructions, when implemented by the processor, provide a cross-layer model, wherein the cross layer model comprises the following equation:

$$P(X_{f_{sd}}, S_{f_{sd}}, N|R_f = f_{sd}) = P(S_{f_{sd}}, X_{f_{sd}}|N, R_f = f_{sd})P(N|R_f = f_{sd}),$$

where $X_{f_{sd}} = (X_i: V_i \in V_{f_{sd}})$ and $S_{f_{sd}} = (S_i: V_i \in V_{f_{sd}})$, $P(S_{f_{sd}}, X_{f_{sd}}|N, R_f = f_{sd})$ corresponds to the physical layer model, which characterizes the probability distribution of the status and the number of affected channels at each node on the attacker's route given the status of each route and the source of attack, $P(N|R_f = f_{sd})$ corresponds to the network layer model, which characterizes the probability distribution of the status of each network route given the source of attack.

14. The system of claim 11, wherein the resilience of the optical network includes an upper bound and a lower bound.

15. The system of claim 11, wherein the executable instructions, when implemented by the processor, represent the cross layer model graphically as a factor graph representation.

16. The system of claim 11, wherein the disturbance comprises crosstalk.

17. The system of claim 11, wherein the optical network is an all optical network.

18. A non-transitory, tangible computer readable medium having a program stored thereon for execution by an instruction execution system to model network layer and physical layer interactions and dependencies in an optical network, the program for performing the steps of:

for a physical layer model, modeling propagation of a disturbance in an optical network under static network conditions based on the disturbance propagation having a threshold effect only on nodes along a route followed by the disturbance, where the physical layer model comprises the following equation:

$$P(X_{f_{sd}}, S_{f_{sd}} \mid N = n, R_f = f_{sd}) =$$
$$\prod_{i=1}^{k-1} P(X_{i+1} \mid X_i, R_f = f_{sd}) \prod_{i=1}^{k} P(S_i \mid X_i, N = n, R_f = f_{sd}),$$

where $S_{f_{sd}} = (S_i : V_i \in V_{f_{sd}})$, and $X_{f_{sd}} = (X_i : V_i \in V_{f_{sd}})$, wherein the physical layer model includes the probability of the number of channels affected S at each network node V given the status X of network routes n and the source of attack $R_f$, where $R_f$ denotes the unidirectional flow $f_{sd}$ where the attack originates;

for a network layer model, modeling a status of each network route in the optical network based on the disturbance; and combining the physical layer model and the network layer model to provide a cross layer model that characterizes the disturbance propagation based on network layer and physical layer dependencies and interactions in the optical network.

19. The non-transitory, tangible computer readable medium of claim 18, wherein the network layer model comprises the following equation:

$$P(N) = \frac{1}{Z_N} \prod_{(V_i - V_i)} \gamma_{ij} \sum_{r_{uv} \in R_{ij}} N_{uv}(1 - \gamma_{ij})^{(1 - \Sigma_{r_{uv} \in R_{ij}} N_{uv})} I_1\left(\sum_{r_{uv} \in R_{ij}} N_{uv}\right),$$

where $$I_1\left(\sum_{r_{uv} \in R_{ij}} N_{uv}\right) = 1 \text{ if } \sum_{r_{uv} \in R_{ij}} N_{uv} = 0 \text{ or } 1; \text{ and } I_1\left(\sum_{r_{uv} \in R_{ij}} N_{uv}\right) = 0$$

otherwise, wherein $$\sum_{r_{uv} \in R_{ij}} N_{uv}$$

is the total number of active connections using wavelength λ on link ij; $\gamma_{ij}$ comprises a weight of using wavelength λ at link ij, wherein a potential function of a clique associated with link ij is $\gamma_{ij}$ if wavelength λ is used at link ij; and $1-\gamma_{ij}$ if wavelength λ is not used at link ij, wherein $Z_N$ is a normalization constant; and the cross layer model comprises the following equation:

$$P(X_{f_{sd}}, S_{f_{sd}}, N \mid R_f = f_{sd}) = P(S_{f_{sd}}, X_{f_{sd}} \mid N, R_f = f_{sd}) P(N \mid R_f = f_{sd}),$$

where $X_{f_{sd}} = (X_i : V_i \in V_{f_{sd}})$ and $S_{f_{sd}} = (S_i : V_i \in V_{f_{sd}})$, $P(S_{f_{sd}}, X_{f_{sd}} \mid N, R_f = f_{sd})$ corresponds to the physical layer model, which characterizes the probability distribution of the status and the number of affected channels at each node on the attacker's route given the status of each route and the source of attack, $P(N \mid R_f = f_{sd})$ corresponds to the network layer model, which characterizes the probability distribution of the status of each network route given the source of attack.

\* \* \* \* \*

UNITED STATES PATENT AND TRADEMARK OFFICE
CERTIFICATE OF CORRECTION

| | |
|---|---|
| PATENT NO. | : 7,903,970 B2 |
| APPLICATION NO. | : 11/694039 |
| DATED | : March 8, 2011 |
| INVENTOR(S) | : Liu et al. |

It is certified that error appears in the above-identified patent and that said Letters Patent is hereby corrected as shown below:

Column 1, lines 7-10, change "This invention was made with government support under agreement ECS-0300305 awarded by the National Science Foundation. The Government has certain rights in the invention." to --This invention was made with Government support under Agreement/Contract Number ECS-0300605, awarded by the National Science Foundation. The Government has certain rights in the invention.--.

Signed and Sealed this
Eleventh Day of October, 2011

David J. Kappos
*Director of the United States Patent and Trademark Office*